United States Patent
Akiyama et al.

(10) Patent No.: US 11,868,026 B2
(45) Date of Patent: Jan. 9, 2024

(54) OPTICAL AD CONVERTER AND OPTICAL RECEIVER

(71) Applicant: Fujitsu Limited, Kawasaki (JP)

(72) Inventors: Tomoyuki Akiyama, Yokohama (JP); Takeshi Hoshida, Kawasaki (JP); Jun Matsui, Kawasaki (JP); Shinsuke Tanaka, Hiratsuka (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/889,951

(22) Filed: Aug. 17, 2022

(65) Prior Publication Data
US 2023/0136573 A1 May 4, 2023

(30) Foreign Application Priority Data
Oct. 28, 2021 (JP) ................................. 2021-177000

(51) Int. Cl.
*G02F 7/00* (2006.01)
*G02F 1/313* (2006.01)

(52) U.S. Cl.
CPC .............. *G02F 7/00* (2013.01); *G02F 1/3137* (2013.01)

(58) Field of Classification Search
CPC .... H04B 10/614; H04B 10/615; H04B 10/60; G02F 1/313; G02F 1/3131; G02F 1/3138; G02F 1/3136; G02F 7/00
See application file for complete search history.

(56) References Cited

U.S. PATENT DOCUMENTS

| 8,953,950 B2* | 2/2015 | Nazarathy ................. G02F 7/00 398/213 |
| 9,356,704 B1* | 5/2016 | Zanoni ...................... G02F 7/00 |
| 9,413,372 B1* | 8/2016 | Valley ..................... G01R 23/17 |
| 2016/0164624 A1 | 6/2016 | Yamauchi |

(Continued)

FOREIGN PATENT DOCUMENTS

| JP | 2017-5551 | 1/2017 |
| JP | 2020-198637 | 12/2020 |

OTHER PUBLICATIONS

Successive-approximation ADC, [online], Wikipedia, [searched on Sep. 6, 2021], Internet <URL:https://en.wikipedia.org/wiki/Successive-approximation_ADC>.

(Continued)

*Primary Examiner* — John R Lee
(74) *Attorney, Agent, or Firm* — STAAS & HALSEY LLP

(57) ABSTRACT

An optical analog-to-digital (AD) converter includes, wherein the optical AD converter converts an analog signal of information included in inputted signal light into a digital signal, and is formed of N stages corresponding to a number N of bits of the digital signal, optical waveguides configured to respectively guide the signal light, base light obtained by branching local light, and reference light obtained by branching the local light, a light receiver configured to detect and compare light levels of the signal light and the reference light, and output a binary comparison result, and an optical modulator configured to variably control a light level of the base light, based on the binary comparison result, in each stage of the N stages, wherein an output variably controlled of the optical modulator is multiplexed with the reference light of a next stage.

12 Claims, 23 Drawing Sheets

(56) References Cited

U.S. PATENT DOCUMENTS

2023/0136573 A1* 5/2023 Akiyama .............. G02F 1/3137
250/227.11

OTHER PUBLICATIONS

Tutorial on Successive Approximation Registers (SAR) and Flash ADCS, Maxim Technical Documents tutorials 1080, [Searched on Sep. 6, 2021], Internet <URL:https://www.maximintegrated.com/en/design/technical-documents/tutorials/1/1080.html>.

* cited by examiner

FIG. 3C
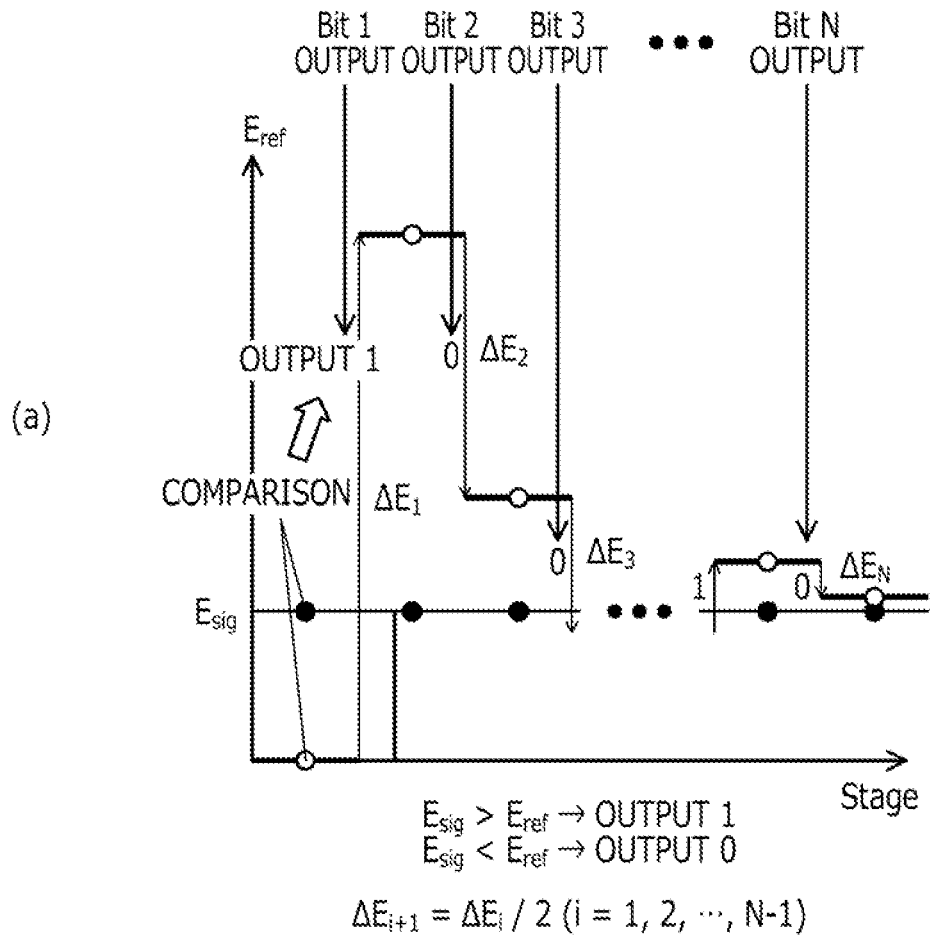
(a)
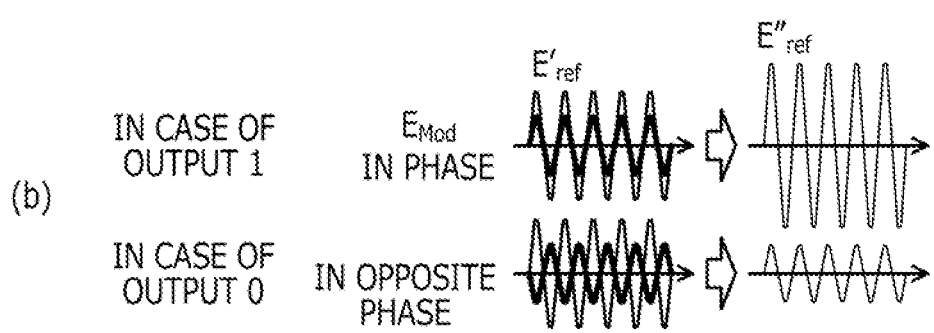
(b)

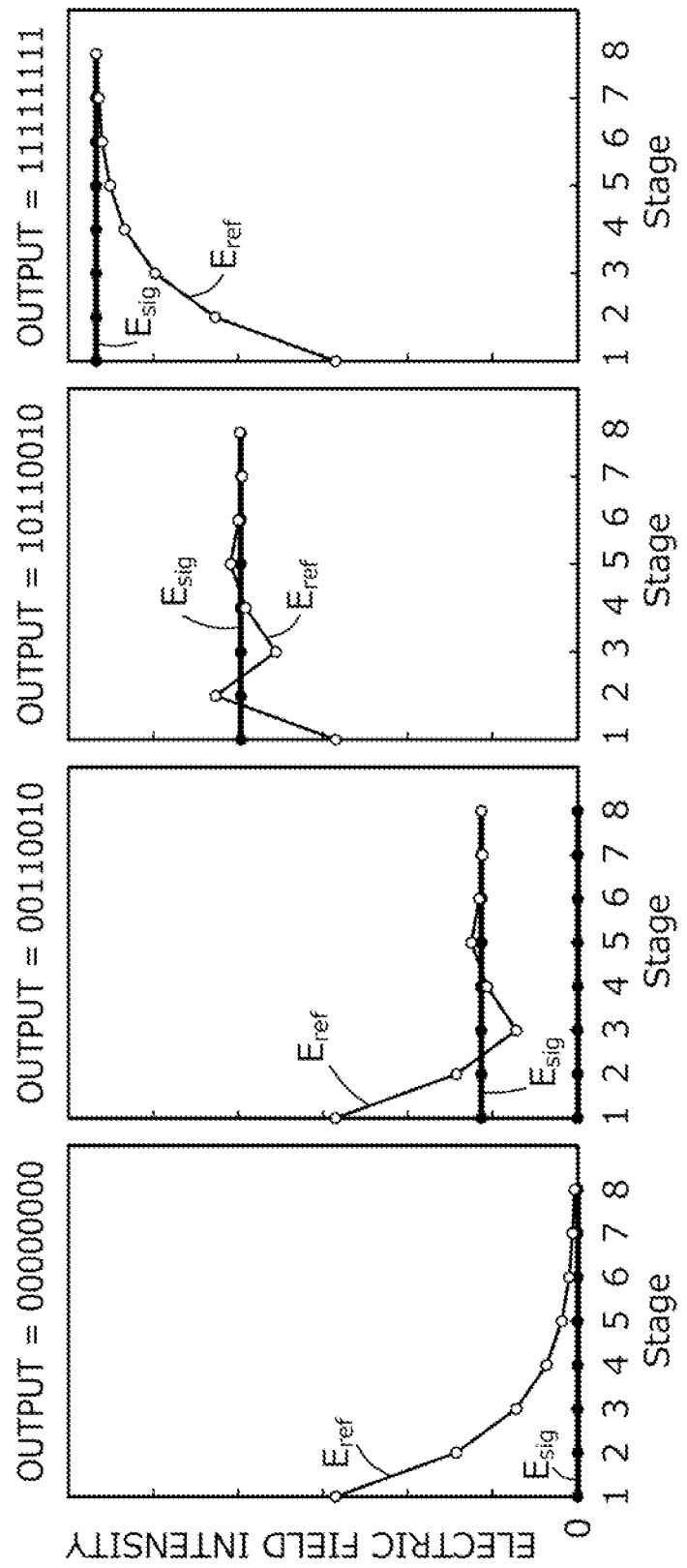

OPTICAL AD CONVERTER AND OPTICAL RECEIVER

CROSS-REFERENCE TO RELATED APPLICATION

This application is based upon and claims the benefit of priority of the prior Japanese Patent Application No. 2021-177000, filed on Oct. 28, 2021, the entire contents of which are incorporated herein by reference.

FIELD

The embodiments discussed herein are related to an optical analog-to-digital (AD) converter and an optical receiver.

BACKGROUND

An optical receiver has to have a function of converting information included in received signal light into a digital electric signal. An existing optical receiver amplifies an analog electric signal obtained by converting received signal light by a light receiving element, and then converts the analog electric signal into a digital electric signal by using an analog-to-digital converter (ADC) realized by an electric circuit.

As a technique related to an optical receiver, for example, there is a technique in which received multiplexed signal light is polarization-separated by a polarization separator and a 90-degree hybrid circuit, signal light of an in-phase component and a quadrature component is converted into an electric signal by a photoelectric converter, the electric signal is amplified by an amplifier, and the amplified signal is output to an ADC. There is a technique in which received signal light is polarization-separated by a polarization division unit, converted into an electric signal by an optical-electric conversion unit, and signal distortion of wavelength dispersion is compensated by a dispersion compensation unit.

For example, there is a successive approximation register (SAR) type AD converter that sequentially compares an analog signal of information included in signal light of an analog signal respectively in N bits, converts the analog signal into a digital signal, and outputs the digital signal.

Japanese Laid-open Patent Publication No. 2020-198637 and Japanese Laid-open Patent Publication No. 2017-5551 are disclosed as related art.

Successive-approximation ADC, [online], Wikipedia, [searched on Sep. 6, 2021], Internet <URL:https://en.wikipedia.org/wiki/Successive-approximation_ADC> and TUTORIAL ON SUCCESSIVE APPROXIMATION REGISTERS (SAR) AND FLASH ADCS, Maxim Technical Documents tutorials 1080, [Searched on Sep. 6, 2021], Internet <URL:https://www.maxi mintegrated.com/en/design/technical-documents/tutorials/1/1080.html> are also disclosed as related art.

SUMMARY

According to an aspect of the embodiments, an optical analog-to-digital (AD) converter includes, wherein the optical AD converter converts an analog signal of information included in inputted signal light into a digital signal, and is formed of N stages corresponding to a number N of bits of the digital signal, optical waveguides configured to respectively guide the signal light, base light obtained by branching local light, and reference light obtained by branching the local light, a light receiver configured to detect and compare light levels of the signal light and the reference light, and output a binary comparison result, and an optical modulator configured to variably control a light level of the base light, based on the binary comparison result, in each stage of the N stages, wherein an output variably controlled of the optical modulator is multiplexed with the reference light of a next stage.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3C is an explanatory diagram of an operation example of the optical AD converter of the embodiment;

FIGS. 7A to 7D are diagrams illustrating power and an output example of a digital signal of converted light and reference light by the optical AD converter;

DESCRIPTION OF EMBODIMENTS

In order to perform AD conversion in an optical receiver, signal light is converted into an analog electric signal by a light receiving element and then converted into a digital electric signal by an ADC of an electric circuit, and thus power consumption of the AD conversion in the optical receiver has increased. In order to cope with high density and large capacity of optical transmission, low-speed ADCs have to be parallelized, and also in this respect, power consumption has increased.

Hereinafter, an embodiment of a technique capable of reducing power consumption by AD conversion including an optical circuit is described in detail with reference to the drawings.

Embodiment

Figure 1:
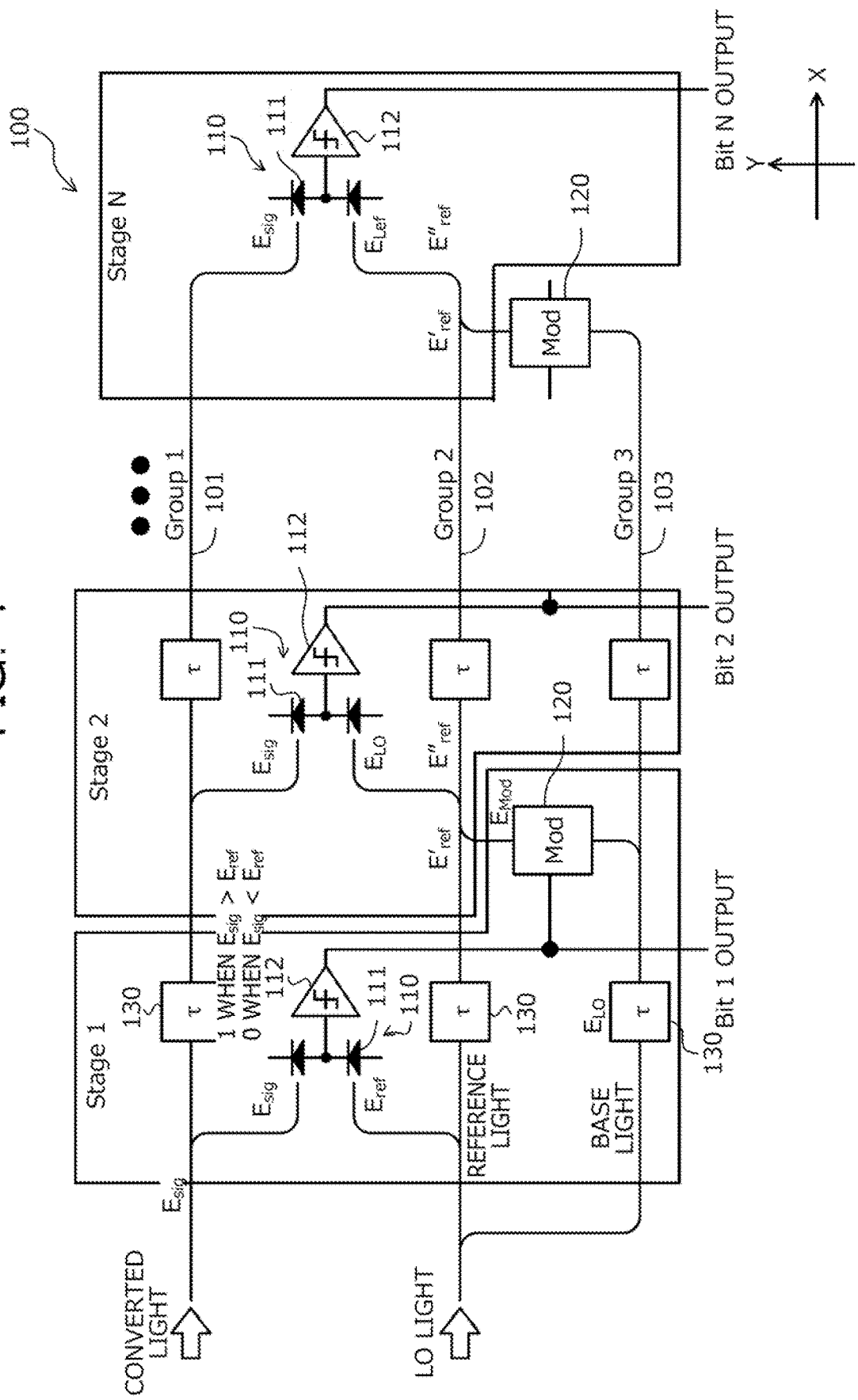
FIG. 1 is a circuit diagram illustrating an optical AD converter according to an embodiment.

FIG. 1 is a circuit diagram illustrating an optical AD converter according to an embodiment. An optical AD converter 100 uses an optical circuit for AD conversion of information included in received signal light. The optical AD converter 100 directly receives signal light (converted light), propagates the signal light through an internal optical circuit, and performs analog-digital conversion.

An analog input of an N-bit electric signal, which is performed by an existing SAR type AD converter only with an electric circuit, is sequentially compared in order from the higher-order bit, and an AD conversion operation of performing an N-bit digital output is performed. The optical AD converter 100 performs an AD conversion operation similar to that of the SAR type AD converter by using the optical circuit and the electric circuit, sequentially compares analog inputs of N-bit signal light in order from the higher-order bit, and performs the N-bit digital output.

Signal light (converted light) $E_{sig}$ that is transmitted and received and local light (LO light) of a local oscillation light source are input to the optical AD converter 100.

As illustrated in FIG. 1, in the optical AD converter 100, a plurality of N stages (Stages 1 to N) is arranged along an optical waveguide direction (X direction in FIG. 1). Each of optical waveguides 101 to 103 of a plurality of groups (Groups 1 to 3) is arranged along a Y direction orthogonal to the X direction in FIG. 1. The number N of stages that are arranged is the number of strings corresponding to the number of bits (resolution) of N-bit (Bit 1 to Bit N, for example, 5-bit, 8-bit, or the like) in a case where information (analog signal) included in the converted light is digitally converted. N-bit includes N-bit-strings of MSB to LSB.

The electric circuit of the optical AD converter 100 includes a light receiving unit 110 arranged in each of the N stages. The light receiving unit 110 outputs a digital signal corresponding to each stage in bits. The light receiving unit 110 includes a light receiving element 111 and a discriminator (comparator) 112. The light receiving element 111 that is a balanced-type (differential-type) light receiving element detects the converted light $E_{sig}$ input to one side and signal light of reference light $E_{ref}$ input to the other side and outputs an electric signal of the difference between the converted light $E_{sig}$ and the reference light $E_{ref}$.

Based on an output (electric signal) of the light receiving element 111, the discriminator 112 compares the magnitude of the light intensity (light level) of the converted light $E_{sig}$ and the reference light $E_{ref}$. As a comparison result, the discriminator 112 outputs a binary digital signal (output 1/0).

The optical circuit of the optical AD converter 100 includes the optical waveguides 101 to 103 that propagate signal light and an optical modulation unit (optical modulator) 120. Based on the input of the binary digital signal (output 1/0 electric signal) which is a comparison result of the discriminator 112, the optical modulation unit 120 multiplexes and outputs a modulation output $E_{Mod}$ obtained by performing phase modulation on base light of Group 3 to the optical waveguide 102 of Group 2. As will be described later, the optical modulation unit 120 performs modulation in phase or in opposite phase with the reference light $E_{ref}$ with reference to the reference light $E_{ref}$ with which the modulation output $E_{Mod}$ is multiplexed.

The converted light $E_{sig}$ input to the optical AD converter 100 is branched and output to each of the N stages via the optical waveguide 101 of Group 1. The optical waveguide 101 of Group 1 guides the converted light $E_{sig}$ in which N-bit information is included to N stages (Stages 1 to N). The converted light $E_{sig}$ of Group 1 is input to the light receiving units 110 of N stages with the same light intensity.

LO light input to the optical AD converter 100 is branched into the reference light $E_{ref}$ and base light $E_{LO}$. The optical waveguide 103 of Group 3 branches and outputs the base light $E_{Lo}$ to the optical modulation units 120 respectively provided in the N stages (Stages 1 to N). The base light of Group 3 is input to the optical modulation units 120 of N stages at the same light intensity.

The optical waveguide 102 of Group 2 guides the reference light $E_{ref}$ so as to sequentially pass through Stages 1 to N of N stages. The optical modulation unit 120 provided in each of the N stages multiplexes the modulation output $E_{Mod}$ with the reference light $E_{ref}$ of Group 2 and supplies the resultant to the next stage. For example, when the light intensity of the reference light of Group 2 output by Stage 1 is set as $E'_{ref}$, the light intensity of the reference light of Stage 2 is changed to $E''_{ref}$ by multiplexing the modulation output $E_{Mod}$ in which the phase is modulated by the optical modulation unit 120 of Stage 1.

A delay device τ (130) that delays signal light is disposed over the optical waveguides 101 to 103 of respective groups (Groups 1 to 3). The delay device τ (130) matches the timing of the signal light of the respective groups (Groups 1 to 3) of the respective N stages (Stages 1 to N). Details of the matching of timing by the delay device τ (130) will be described later.

Figure 2A:
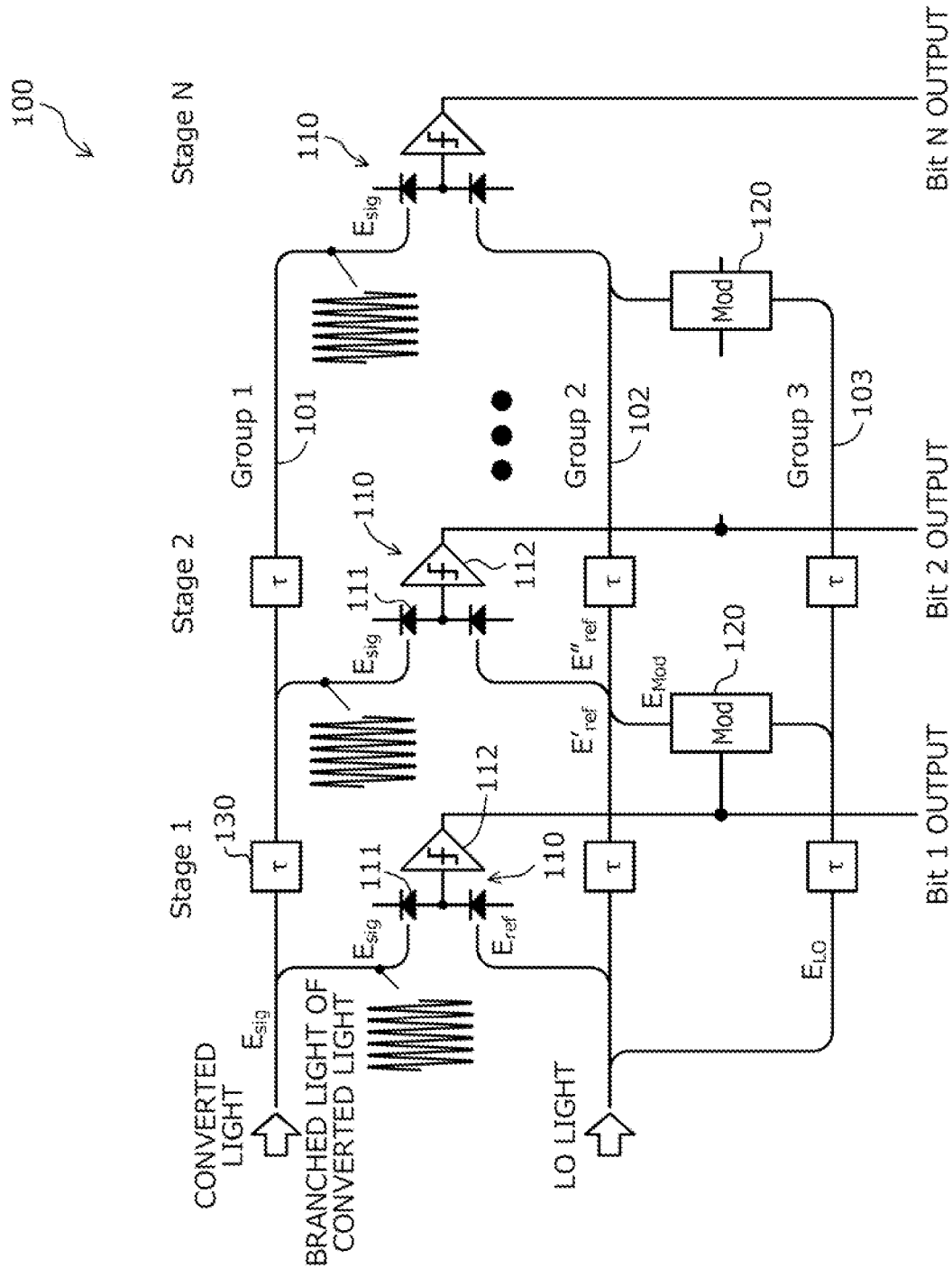
FIG. 2A is an explanatory diagram of a configuration of an internal circuit of the optical AD converter (part 1)

FIG. 2A to FIG. 2F are explanatory diagrams of a configuration of an internal circuit of the optical AD converter. A configuration and an operation example of the optical AD converter 100 along the guided wave of the signal light will be described with reference to these drawings. As illustrated in FIG. 2A, the converted light $E_{sig}$ that is input to the optical AD converter 100 is branched from the optical waveguide 101 of Group 1 in Stage 1 at the top, and is input to the light receiving element 111 of the light receiving unit 110. Also in the latter Stages 2 to N, the converted light $E_{sig}$ is branched from the optical waveguide 101 of Group 1 and input to the light receiving element 111 of the light receiving unit 110. The converted light $E_{sig}$ is input to the light receiving units 110 of the N stages (Stages 1 to N) at the same light intensity.

Figure 2B:
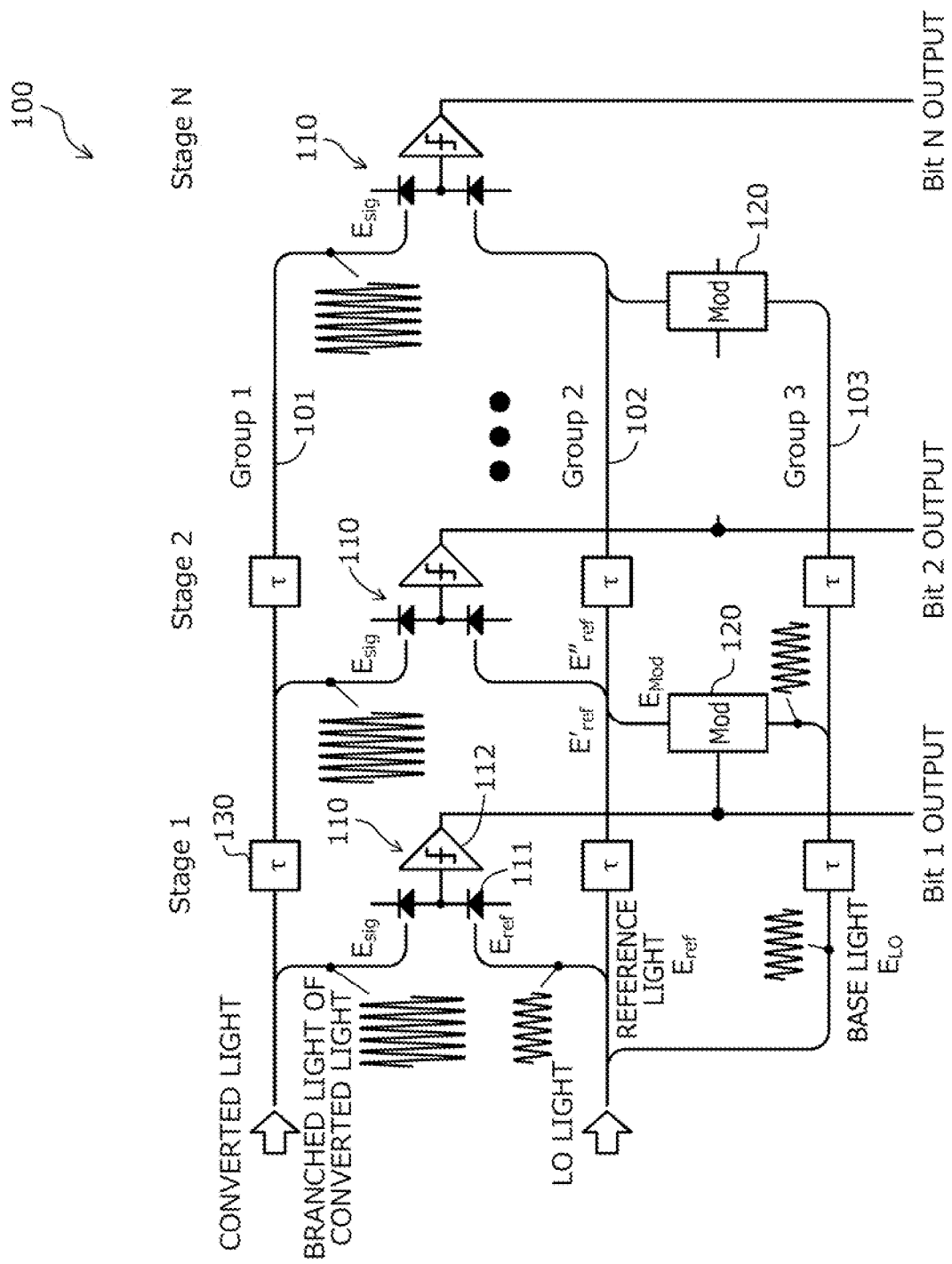
FIG. 2B is an explanatory diagram of a configuration of the internal circuit of the optical AD converter (part 2)

As illustrated in FIG. 2B, the LO light input to the optical AD converter 100 is branched into the reference light of the optical waveguide 102 of Group 2 and the base light of the optical waveguide 103 of Group 3. Sequentially through Stages 1 to N, the reference light $E_{ref}$ of the optical waveguide 102 of Group 2 is branched and input to the light receiving element 111 of the light receiving unit 110 of each of Stages 1 to N. As described above, the reference light $E_{ref}$ may have different light intensities for every stage of Stages 1 to N based on the modulation output $E_{Mod}$ of the optical modulation unit 120.

The base light of the optical waveguide 103 of Group 3 is branched and input respectively to the optical modulation units 120 of Stages 1 to N. The base light is input to the optical modulation units 120 of N stages (Stages 1 to N) at the same light intensity.

Figure 2C:
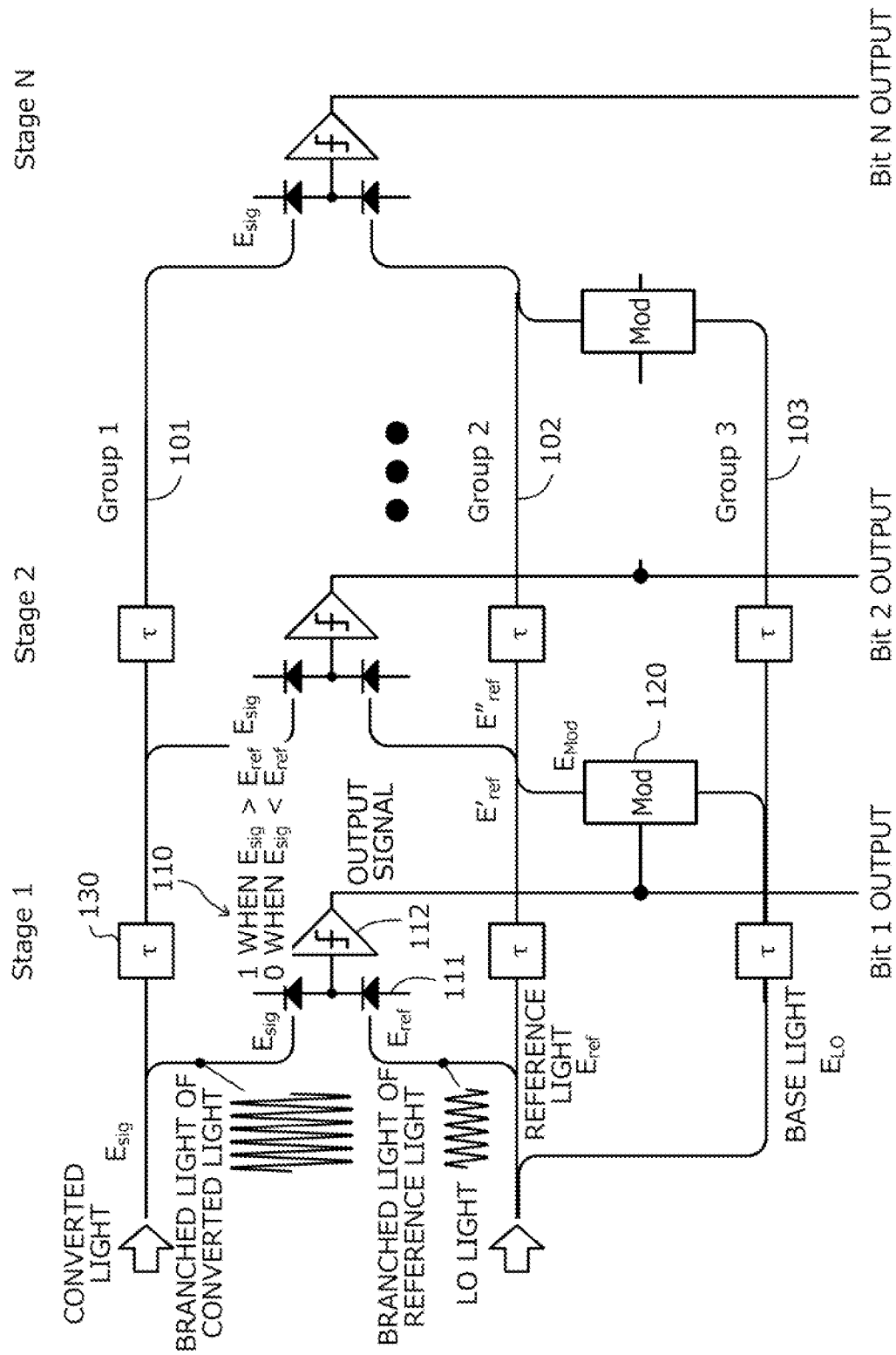
FIG. 2C is an explanatory diagram of a configuration of the internal circuit of the optical AD converter (part 3)

As illustrated in FIG. 2C, the light receiving unit 110 provided in each of Stages 1 to N performs photoelectric conversion on the converted light $E_{sig}$ and the signal light of the reference light $E_{ref}$ by the light receiving element 111. The discriminator 112 of the light receiving unit 110 digitally outputs a bit corresponding to Stage 1 as a comparison result obtained by comparing the magnitude of light reception levels of the converted light $E_{sig}$ and the reference light $E_{ref}$. The discriminator 112 digitally outputs a digital signal (1/0) of Bit 1 (MSB).

The discriminator 112 compares the magnitude of the light reception levels of the converted light $E_{sig}$ and the reference light $E_{ref}$, and outputs Bit 1=1 when the converted light $E_{sig}$>the reference light $E_{ref}$. When the converted light $E_{sig}$<the reference light $E_{ref}$, Bit 1=0 is output. When the converted light $E_{sig}$=the reference light $E_{ref}$, Bit 1 output=0 is output.

An output of the electric signal of the discriminator 112 is output to the optical modulation unit 120. The base light of Group 3 is branched and input to the optical modulation unit 120. The comparison result between the converted light $E_{sig}$ and the reference light $E_{ref}$ output by the light receiving unit 110 (discriminator 112) is input to the optical modulation unit 120.

Figure 2D:
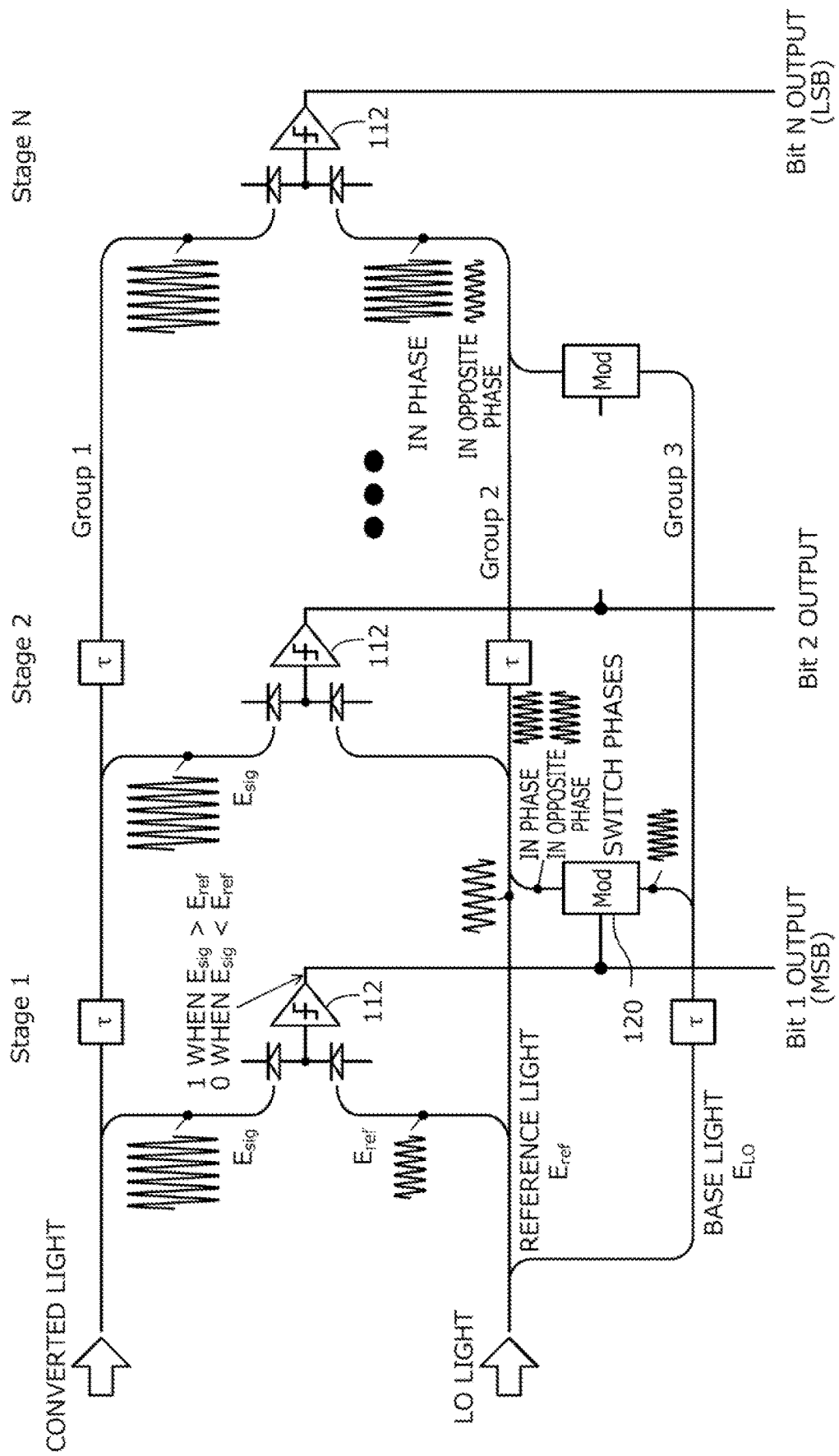
FIG. 2D is an explanatory diagram of a configuration of the internal circuit of the optical AD converter (part 4)

As illustrated in FIG. 2D, the optical modulation unit 120 performs modulation on the base light of Group 3 based on the comparison result (output 1/0) input thereto such that the modulation is in phase or in opposite phase with the reference light $E_{ref}$ with reference to the reference light $E_{ref}$ with which the modulation output $E_{Mod}$ is multiplexed. For example, when the comparison result of the discriminator 112 is the output 1, the optical modulation unit 120 performs phase modulation in phase with reference light $E_{ref}$. When the comparison result is the output 0, the optical modulation unit 120 performs phase modulation in opposite phase with the reference light $E_{ref}$. As described above, the optical modulation unit 120 switches the phase of the signal light in accordance with the comparison result 1/0, and outputs the modulation output $E_{Mod}$ of the comparison result in Stage 1.

Figure 2E:
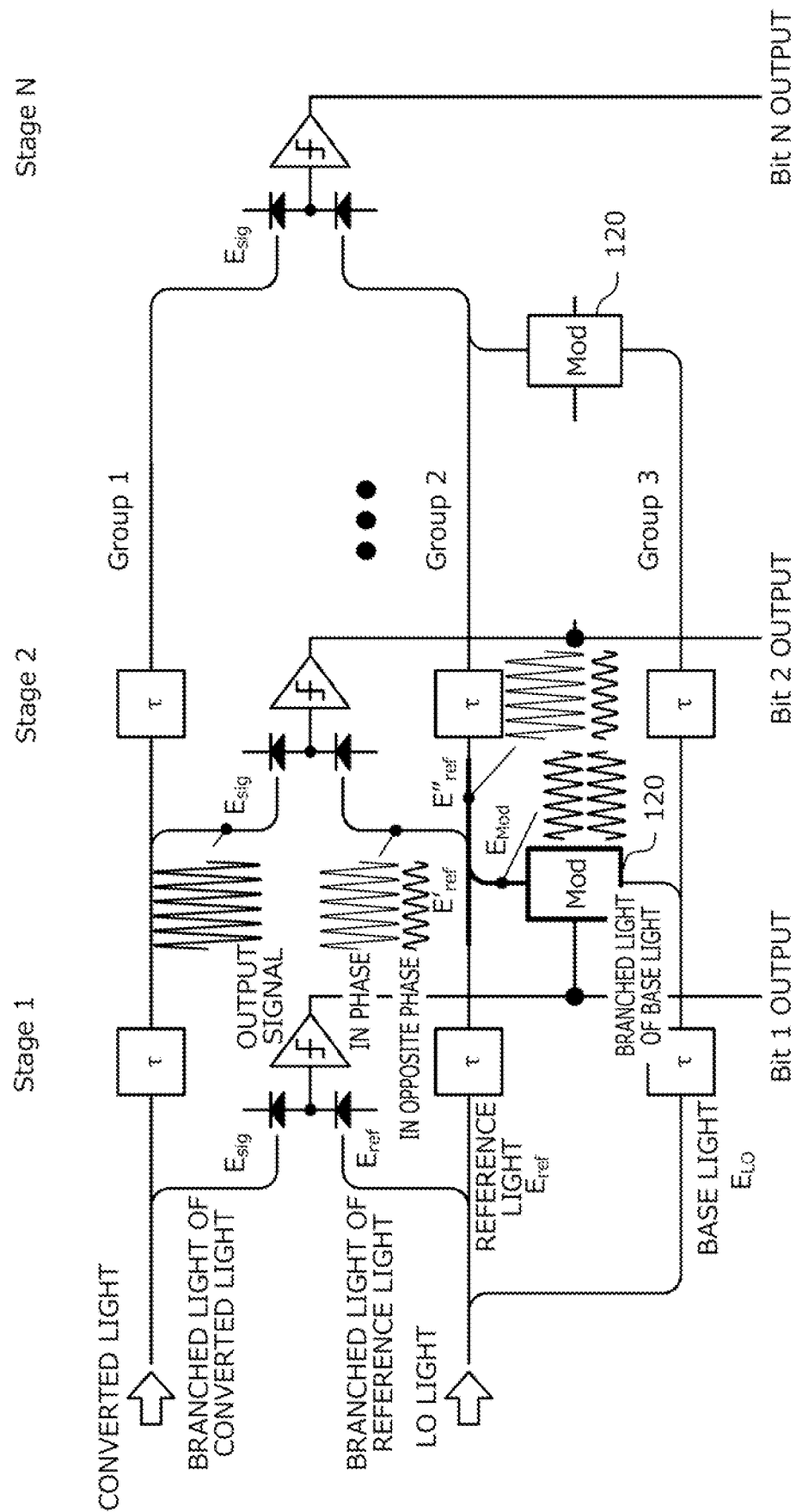
FIG. 2E is an explanatory diagram of a configuration of the internal circuit of the optical AD converter (part 5)

As illustrated in FIG. 2E, the modulation output $E_{Mod}$ of the optical modulation unit 120 is multiplexed with and input to the reference light of Group 2. Accordingly, for example, the intensity of the reference light supplied to Stage 2 of the next stage is varied in accordance with the modulation output $E_{Mod}$ of the optical modulation unit 120 of Stage 1. Assuming that the reference light of Stage 1 is $E'_{ref}$, the intensity of the reference light of Stage 2 is changed to Fref by multiplexing the modulation output $E_{Mod}$.

For example, when the comparison result of the discriminator 112 of Stage 1 is the output 1, the modulation output $E_{Mod}$ of the optical modulation unit 120 is in phase, and the light level of the reference light $E_{ref}$ of Stage 2 increases (for example, 1.5 times). On the other hand, when the comparison result of the discriminator 112 of Stage 1 is the output 0, the modulation output $E_{Mod}$ of the optical modulation unit 120 is in opposite phase, and the light level of the reference light $E_{ref}$ of Stage 2 decreases (for example, 0.5 times).

The configurations of Stage 2 to Stage N−1 are similar to that of Stage 1. Accordingly, Stage 2 to Stage N−1 respectively perform digital output of N-bits (Bit 2 to Bit N−1) in the same manner as Stage 1.

Figure 2F:
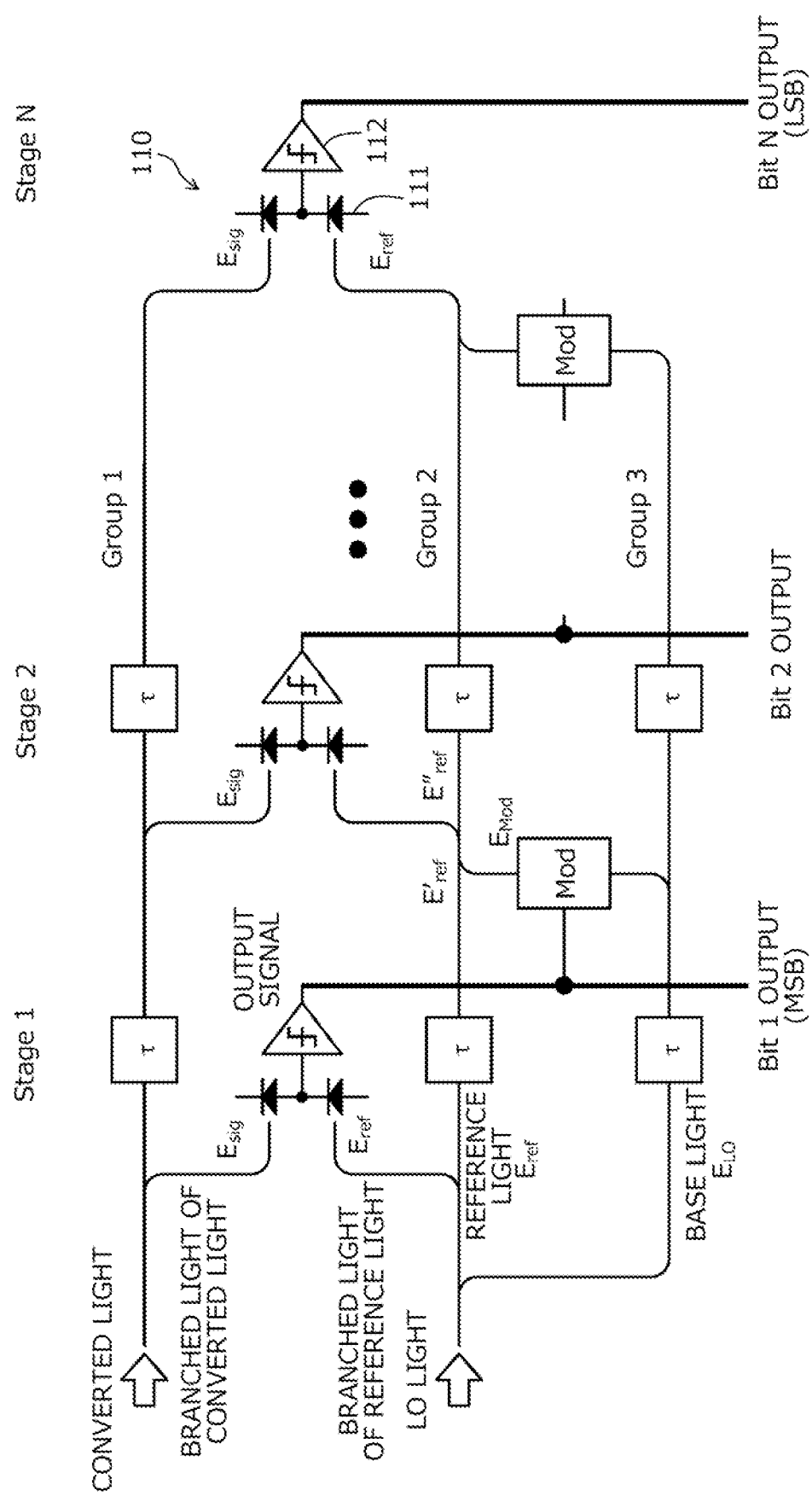
FIG. 2F is an explanatory diagram of a configuration of the internal circuit of the optical AD converter (part 6)

As illustrated in FIG. 2F, the light receiving unit 110 (light receiving element 111 and discriminator 112) is provided in Stage N. The converted light $E_{sig}$ of Group 1 and the reference light $E_{ref}$ of Group 2 that has passed through Stage N−1 are input to the light receiving unit 110 of Stage N. The light receiving unit 110 (discriminator 112) of Stage N performs digital output of Bit N.

Figure 3A:
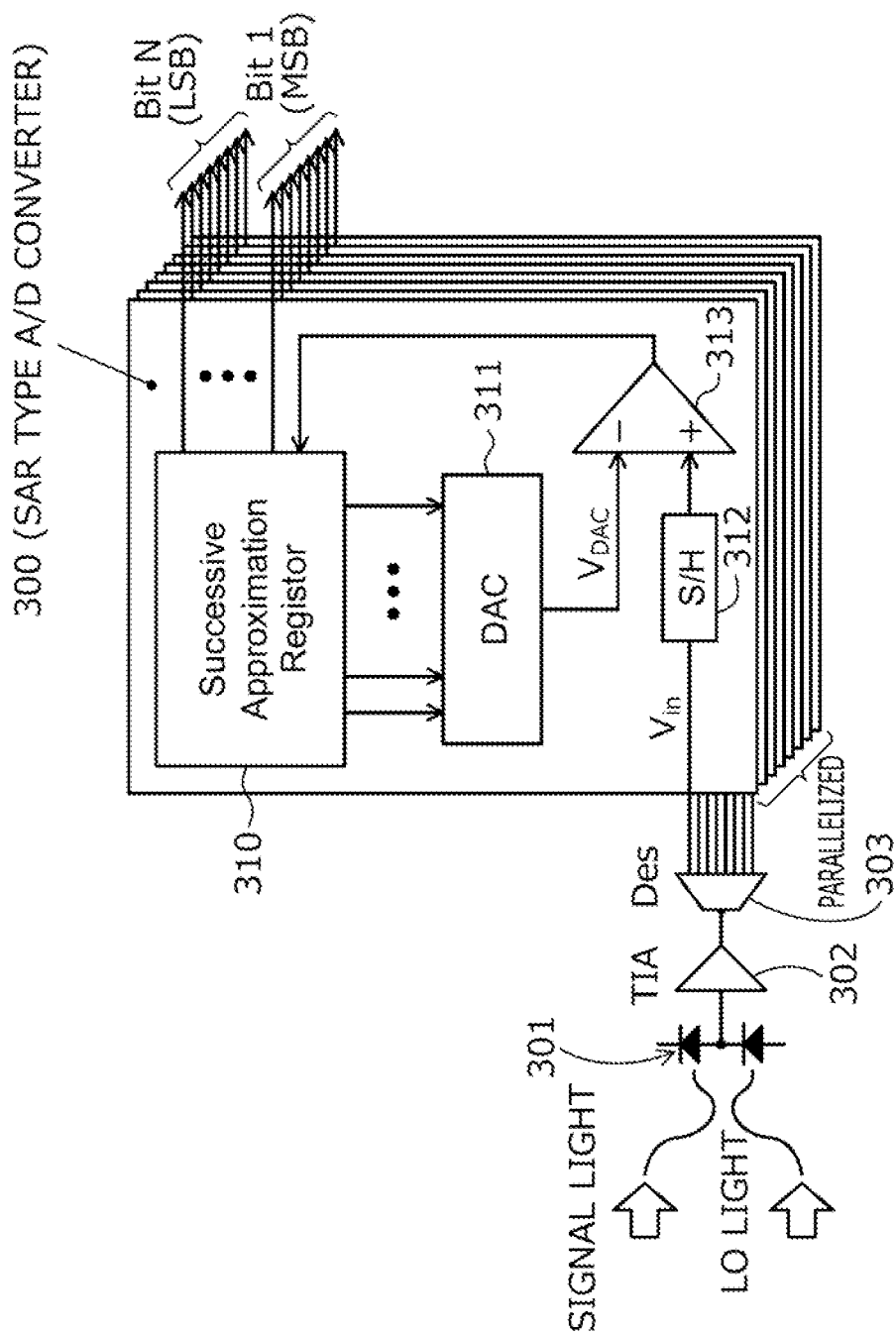
FIG. 3A is a diagram illustrating a configuration example of an existing SAR type AD converter.
Figure 3B:
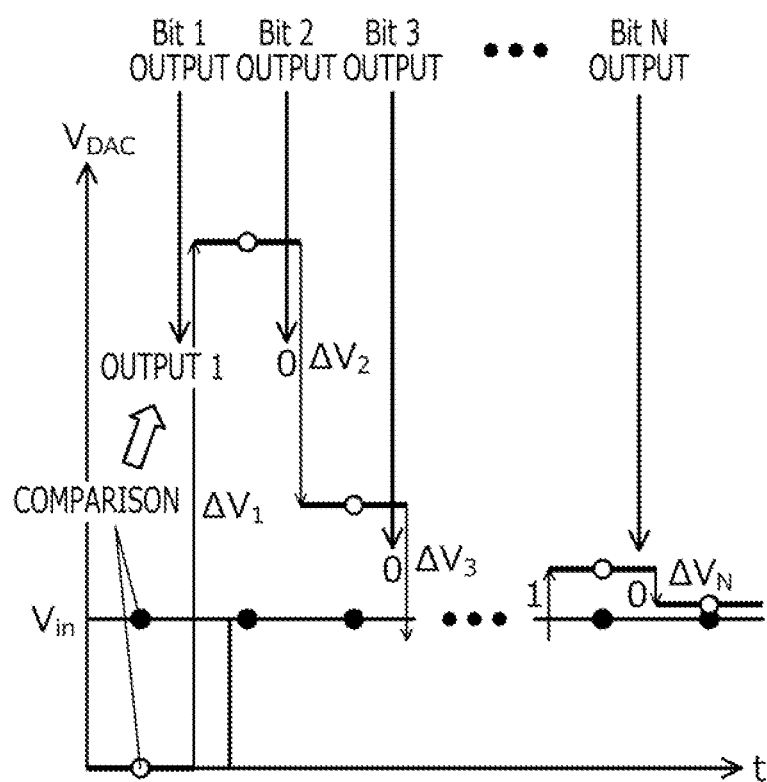
FIG. 3B is an explanatory diagram of an operation example of the existing SAR type AD converter.

A configuration and an operation example of an existing SAR type AD converter will be described. FIG. 3A is a diagram illustrating a configuration example of an existing SAR type AD converter, and FIG. 3B is an explanatory diagram illustrating an operation example of an existing SAR type AD converter. In addition, FIG. 3C is an explanatory diagram illustrating an operation example of the optical AD converter of the embodiment.

As illustrated in FIG. 3A, in a case where signal light is subjected to AD conversion, the SAR type AD converter 300 is used. A light receiving element 301, a transresistance (transimpedance) amplifier (TIA) 302, and a deserializer (Des) 303 are disposed at a previous stage of the SAR type AD converter 300.

The light receiving element 301 of differential-type performs photoelectric conversion on a pair of signal lights obtained by multiplexing received signal light and LO light of a light source, and amplifies the pair of signal lights by the TIA 302. An analog signal of the TIA 302 is parallelized by the deserializer 303 and input to the SAR type AD converter 300.

The SAR type AD converter 300 includes a successive approximation register (SAR) 310, a digital-to-analog converter (DAC) 311, a sample and hold (S/H) circuit 312, and a discriminator 313. The sample and hold circuit 312 holds a predetermined voltage $V_{in}$ input thereto. The voltage $V_{in}$ is a voltage corresponding to the value of the N-bit digital signal included in the received signal. The discriminator 313 compares $V_{in}$ with an output of the DAC 311 and outputs a comparison result to the successive approximation register (SAR) 310.

In FIG. 3B, the horizontal axis indicates time and the vertical axis indicates voltage. As illustrated in FIG. 3B, the MSB of the successive approximation register (SAR) 310 is initialized to 1 in an initial state and is supplied to the DAC 311. The DAC 311 supplies an analog signal $V_{DAC}$ corresponding to a digital code (Vref/2) to the discriminator 313.

The discriminator 313 compares $V_{DAC}$ of the higher-order bit (MSB) and $V_{in}$, and when the voltage of $V_{DAC}$ does not exceed $V_{in}$, the output of bit 1 is kept at 1, and when the voltage of $V_{DAC}$ exceeds $V_{in}$, the bit (Bit 1) is reset (0) with respect to the SAR 310.

After that, the SAR 310 sets the next lower-order bit (Bit 2) to 1, performs the same test, and continues the same processing until the test is completed for all N bits of the SAR 310. As described above, the SAR 310 sequentially compares $V_{DAC}$ and $V_{in}$ for N bits bit by bit, and thus digitally outputs N-bit values each of which is obtained by digitally approximating the sampled input voltage $V_{in}$.

As illustrated in FIG. 3C, the optical AD converter 100 of the embodiment also performs an operation similar to that of the existing SAR type AD converter 300. The horizontal axis in FIG. 3C(a) indicates N stages, and the vertical axis indicates voltage. The converted light $E_{sig}$ has a predetermined voltage corresponding to the N-bit value. For each Bit in the order of Stages 1 to N of N stages, the optical AD converter 100 outputs the digital signal (1/0) corresponding to the comparison result between the converted light $E_{sig}$ and the reference light $E_{ref}$.

The discriminator 112 of Stage 1 outputs Bit 1=1 from the converted light $E_{sig}$>the reference light $E_{ref}$. At this time, as illustrated in FIG. 3C(b), the modulation output $E_{Mod}$ of the optical modulation unit 120 of Stage 1 is in phase, and the light level of the reference light $E''_{ref}$ of Stage 2 is increased by $\Delta E_1$ (for example, 1.5 times).

After that, the converted light $E_{sig}$ and the reference light $E_{ref}$ after passing through Stage 1 are input to Stage 2. The light receiving unit 110 (discriminator 112) of Stage 2 performs digital output of Bit 2 in the same manner as Stage 1. The discriminator 112 of Stage 2 outputs Bit 2=0 from the converted light $E_{sig}$<the reference light $E_{ref}$. At this time, as illustrated in FIG. 3C(b), the modulation output $E_{Mod}$ of the optical modulation unit 120 of Stage 2 is in opposite phase, and the light level of the reference light $E''_{ref}$ of Stage 2 is decreased by $\Delta E_2$ (for example, 0.5 times). As described above, similarly to the existing SAR type AD converter 100, the optical AD converter 100 performs bit-by-bit sequential comparison and performs digital output for N bits.

Generally, an output voltage of the TIA 302 is not linear relative to an input voltage, and the output voltage tends to be saturated in a region close to an upper limit. To suppress this influence, it is requested that the TIA 302 with higher voltage output and wider range of linear output voltage is used. However, in a case where the TIA 302 having good linearity is used, power consumption increases in exchange for linearity. This also similarly occurs in the DAC 311 of the SAR type AD converter 300.

By contrast, the optical AD converter 100 of the embodiment is configured such that the optical circuit and the electric circuit are appropriately disposed. Corresponding to the subtraction and addition and the function of the signal latch included in the existing SAR type AD converter 300 of the successive approximation (SAR) method, in the embodiment, based on the determination result of the previous Stage, the reference light with which the modulation output of the optical modulation unit 120 is multiplexed is used as a reference, modulation in phase or in opposite phase is performed on the phase of the reference light, and the reference light is multiplexed and interfered with reference light in the latter stage. According to the embodiment, the LO light is supplied to each stage as separate groups of the base light and the reference light, and the converted light is compared with the reference light in the light receiving unit 110 of each stage, thereby realizing a function equivalent to the latch function of the S/H circuit 312.

Comparing the existing AD converter 300 and the optical AD converter 100 of the embodiment, in the optical AD converter 100 of the embodiment, the light receiving element 111 is disposed in each of the N stages corresponding to the light receiving element 301 at the forefront stage of the existing AD converter 300. The TIA 302 used in the existing AD converter 300 is not used in the optical AD converter 100 of the embodiment, and the discriminator 112 is disposed in each of the N stages. The Des 303 used in the existing AD converter 300 is not used in the optical AD converter 100 of the embodiment.

As described above, since the optical AD converter 100 of the embodiment includes the optical circuit therein, the linearity requested in a linear electronic circuit, for example, the TIA 302 and the DAC 311, which is requested in the AD conversion using the existing SAR type AD converter 300, may be omitted. Accordingly, according to the embodiment, it is possible to reduce power consumption as compared with the existing technique.

Further, since the existing AD converter 300 itself is slow, as illustrated in FIG. 3A, high-speed processing is supported by arranging the AD converter 300 in parallel in the subsequent stage of the Des 303. By contrast, in the embodiment, the parallel arrangement of the existing SAR type AD converter 300 including the electric circuit is not requested, and thus power consumption may be reduced.

Figure 4B:
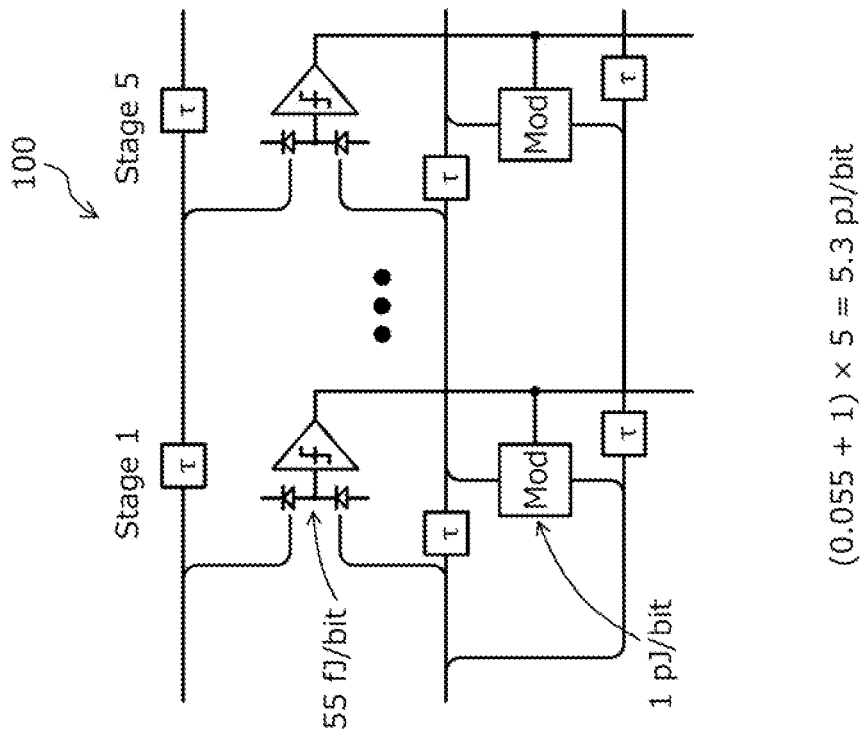
FIGS. 4A and 4B are a comparison diagram of power consumption between the existing technique and the embodiment.
Figure 4A:
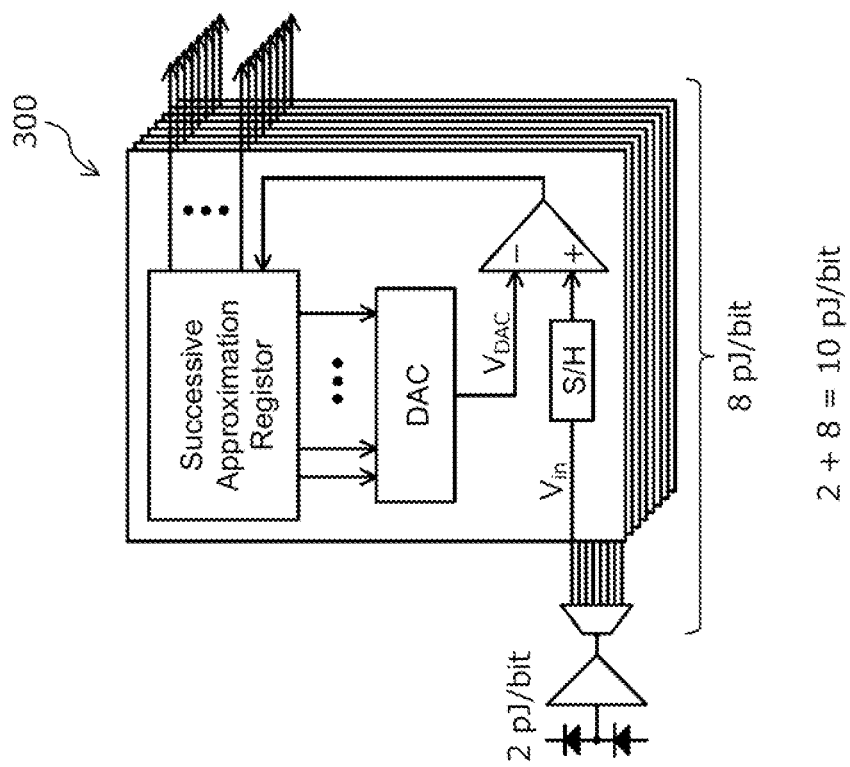

FIGS. 4A and 4B are a comparison diagram of power consumption between the existing technique and the embodiment. FIG. 4A illustrates the existing SAR type AD converter 300, and FIG. 4B illustrates the optical AD converter 100 of the embodiment. Power consumption by the existing technique illustrated in FIG. 4A is 2 pJ/bit for the TIA 302 part and 8 pJ/bit for the SAR type AD converter 300 part. According to the existing technique, since the TIA 302 and the DAC 311 have to have linearity, power consumption increases. As a result, in the existing technique, the entire power consumption is 2+8=10 pJ/bit per bit.

By contrast, the power consumption of the optical AD converter 100 of the embodiment illustrated in FIG. 4B is 55 fJ/bit for the light receiving unit 110 (discriminator 112) and 1 pJ/bit for the optical modulation unit 120 per one stage. When the N-bit output is 5, the overall power consumption is (0.055+1)×5=5.3 pJ/bit. As described above, according to the embodiment, it is possible to achieve lower power consumption than that of the existing technique.

Figure 5:
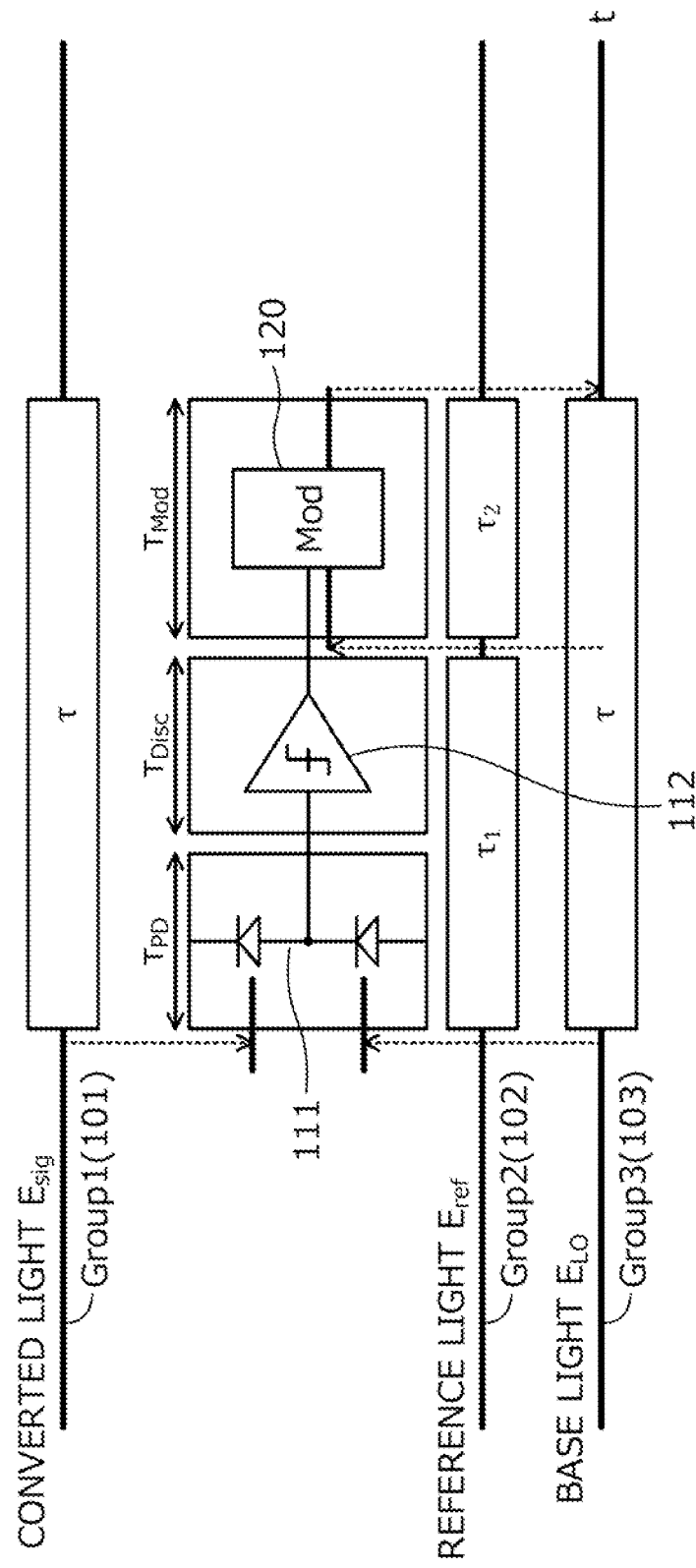
FIG. 5 is an explanatory diagram of delay amount setting of a delay unit disposed in the optical AD converter.

FIG. 5 is an explanatory diagram of delay amount setting of a delay unit arranged in the optical AD converter. The horizontal axis in FIG. 5 indicates time, and the vertical axis indicates signal light guided through the optical waveguides 101 to 103 of Groups 1 to 3 respectively in the optical AD converter 100. Neither the converted light $E_{sig}$ that is guided through the optical waveguide 101 of Group 1 nor the base light $E_{Lo}$ guided through the optical waveguide 103 of Group 3 has the optical circuit, and thus have the same delay time τ.

The light receiving element 111 of the light receiving unit 110 has a delay time $\tau_{PD}$ for photoelectric conversion, and the discriminator 112 has a delay time $\tau_{Disc}$ for comparison and determination. The optical modulation unit 120 has a delay time $\tau_{Mod}$ in the modulation operation. A delay time $\tau_1$ in the light receiving unit 110 is equal to the delay time $\tau_{PD}$ of the light receiving element 111+the delay time $\tau_{Disc}$ of the discriminator 112. A delay time $\tau_2$ of the optical modulation unit 120=Tmod. For this reason, in the optical AD converter 100, a delay time $\tau_1+T_2$ of optical guiding is generated in the optical waveguide 102 of Group 2 of the light receiving unit 110 and the optical modulation unit 120.

For this reason, the delay device τ (130) having a delay of the delay time τ ($=\tau_i+\tau_2$) corresponding to the delay time $\tau_i+\tau_2$ is disposed over the optical waveguide 101 of Group 1 and the optical waveguide 103 of Group 3 in each Stage. Accordingly, the timing of the signal light input to each Stage may be matched (at the same timing) between respective Groups 1 to 3 (optical waveguides 101 to 103). As illustrated in FIG. 1, the delay device τ (130) for fine adjustment may also be disposed over the optical waveguide 102 of Group 2.

Figure 6B:
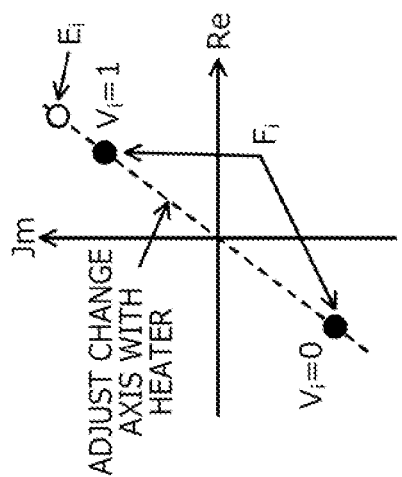
FIGS. 6A and 6B are diagrams illustrating a schematic configuration example of an optical modulator.
Figure 6A:
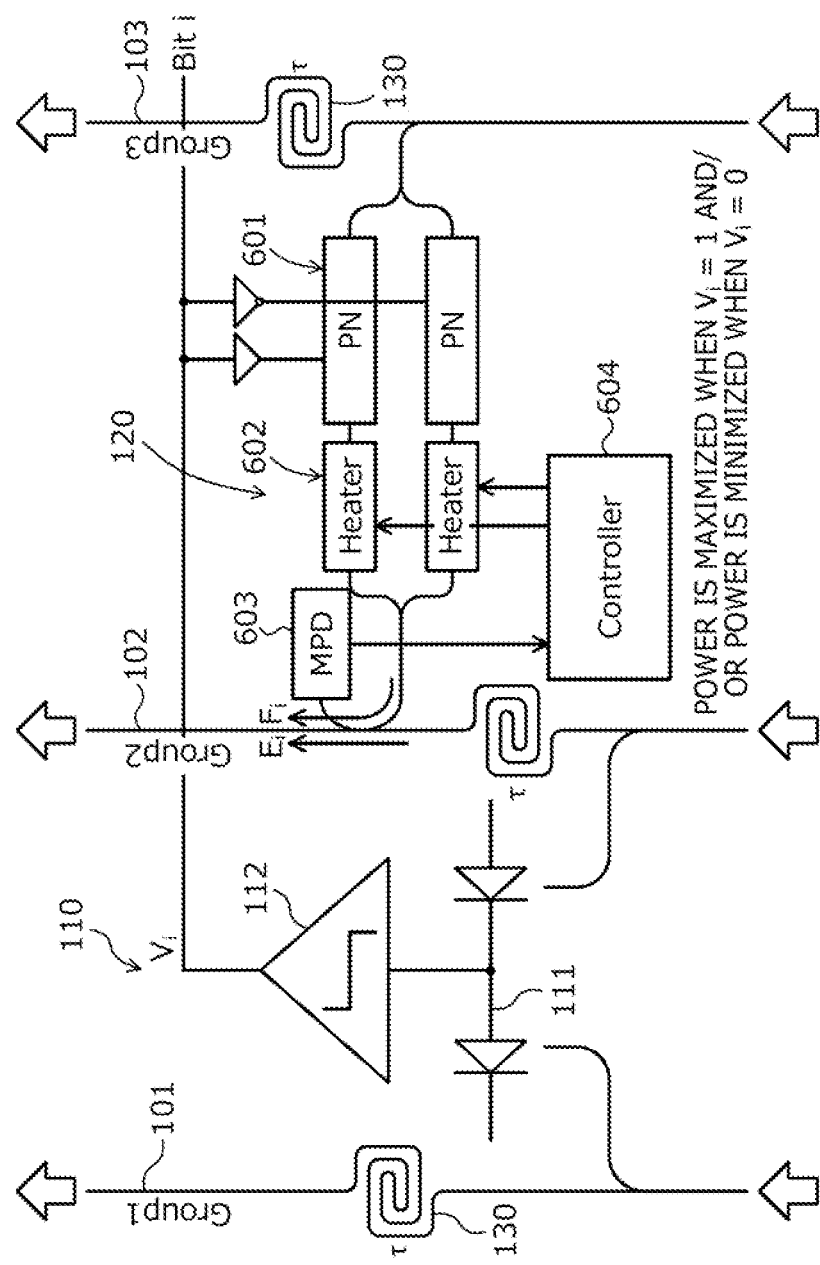

FIGS. 6A and 6B are diagrams illustrating a schematic configuration example of the optical modulator. FIG. 6A illustrates functions of the optical modulation unit 120 for one stage. As illustrated in FIG. 6A, the delay device τ (130) of each of Groups 1 to 3 (optical waveguides 101 to 103) is formed by forming a part of the optical waveguide in a spiral shape, and thus it is possible to increase a waveguide length and obtain a predetermined delay time τ.

The optical modulation unit 120 includes, for example, a pair of PN units 601, a pair of heaters 602, an optical detection unit (MPD) 603, and a controller 604. The PN units 601 include two interference portions including a pair of electrodes arranged along respective branched optical waveguides.

Based on the output $V_i(1/0)$ of the discriminator 112, the controller 604 variably controls voltages applied to the pair of electrodes to change the interference state of the interference portion. As a result, the optical modulation unit 120 performs phase modulation on the base light $E_{LO}$ of Group 3 (optical waveguide 103) and outputs the modulation output $E_{Mod}$ in phase or in opposite phase. The heater 602 adjusts the temperature of the PN units 601. The MPD 603 monitors an output of the optical modulation unit 120 and outputs the monitored output to the controller 604.

Based on the output $V_i(1/0)$ of the discriminator 112, the controller 604 performs control so as to output the modulation output $E_{Mod}$, for example, in which power is maximized when $V_i=1$, and power of the modulation output is minimized when $V_i=0$. Based on the monitor output of the MPD 603, the controller 604 performs temperature adjustment by the heater 602 and changes the interference state in the PN unit 601 thereby to output the modulation output $E_{Mod}$ in phase or in opposite phase.

FIG. 6B illustrates an orthogonal axis of I (Re)–Q (Jm). At this IQ-axis, the controller 604 performs temperature adjustment by the heater 602 such that the power $F_i$ of $V_i=0$ and $V_i=1$ is located in the same straight line on the line between the center and the power (electric field intensity) $E_i$ of the reference light $E_{ref}$ guided over the optical waveguide 102 of Group 2.

FIGS. 7A to 7D are diagrams illustrating power and an output example of a digital signal of converted light and reference light by the optical AD converter. FIGS. 7A to 7D illustrate bit strings in which a digital signal included in the converted light have different values in 8 bits. In this case, the optical AD converter 100 has N=8 (Stages 1 to 8). The horizontal axis in each figure indicates the number of stages, and the vertical axis indicates the electric field intensity.

As illustrated in FIG. 7A, when all the values of the digital output are 0 "00000000", the electric field intensity of the converted light $E_{sig}$ is the lowest (0), and as illustrated in FIG. 7D, when all the values of the digital output are 1 "11111111", the electric field intensity of the converted light $E_{sig}$ is the highest.

In the case illustrated in FIG. 7A, the optical AD converter 100 sequentially compares the converted light $E_{sig}$ with the reference light $E_{ref}$ in Stages 1 to 8 to perform digital output for each bit. At this time, for each processing in Stages 1 to 8, the electric field intensity of the reference light $E_{ref}$ decreases so as to converge to the electric field intensity (0) of the converted light $E_{sig}$.

Also in FIG. 7D, the optical AD converter 100 sequentially compares the converted light $E_{sig}$ with the reference light $E_{ref}$ in Stages 1 to 8 to perform digital output for each bit. At this time, for each processing in Stages 1 to 8, the electric field intensity of the reference light $E_{ref}$ increases so as to converge to a predetermined electric field intensity of the converted light $E_{sig}$.

Also in the case illustrated in FIGS. 7B and 7C, the optical AD converter 100 sequentially compares the converted light $E_{sig}$ with the reference light $E_{ref}$ to perform digital output for each bit in Stages 1 to 8. At this time, for each processing in Stages 1 to 8, the electric field intensity of the reference light $E_{ref}$ converges to a predetermined electric field intensity of the converted light $E_{sig}$. Convergence operations in the optical AD converter 100 illustrated in FIGS. 7A to 7D are similar to the operation of the existing AD converter 300 (see FIG. 3A and the like).

Figure 8:
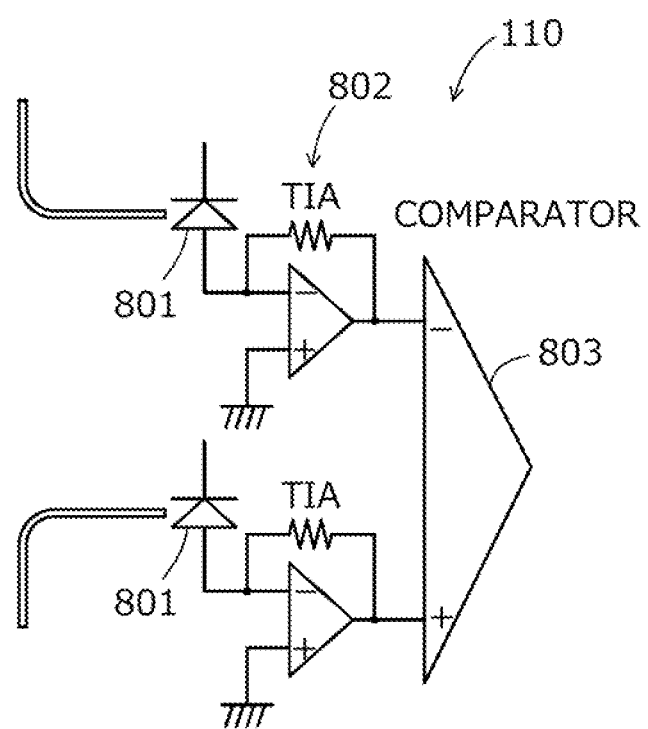
FIG. 8 is a diagram illustrating another configuration example of a light receiving unit of the optical AD converter.

FIG. 8 is a diagram illustrating another configuration example of the light receiving unit of the optical AD converter. As described above, although the light receiving unit 110 is configured by the light receiving element 111 and the discriminator 112 in FIG. 1 and the like, the configuration is not limited thereto. The light receiving unit 110 illustrated in FIG. 8 includes a pair of light receiving elements (PD) 801, a pair of TIAs 802, and a comparator 803 that compares outputs of the pair of TIAs 802. Also in such a configuration, it is possible to compare the converted light $E_{sig}$ and the reference light $E_{ref}$ and output the comparison result to the optical modulation unit 120.

Other Embodiments

Next, other embodiment of the optical AD converter will be described. In the following description, an optical AD converter for IQ modulation that receives polarization-multiplexed signal light will be described.

Figure 9:
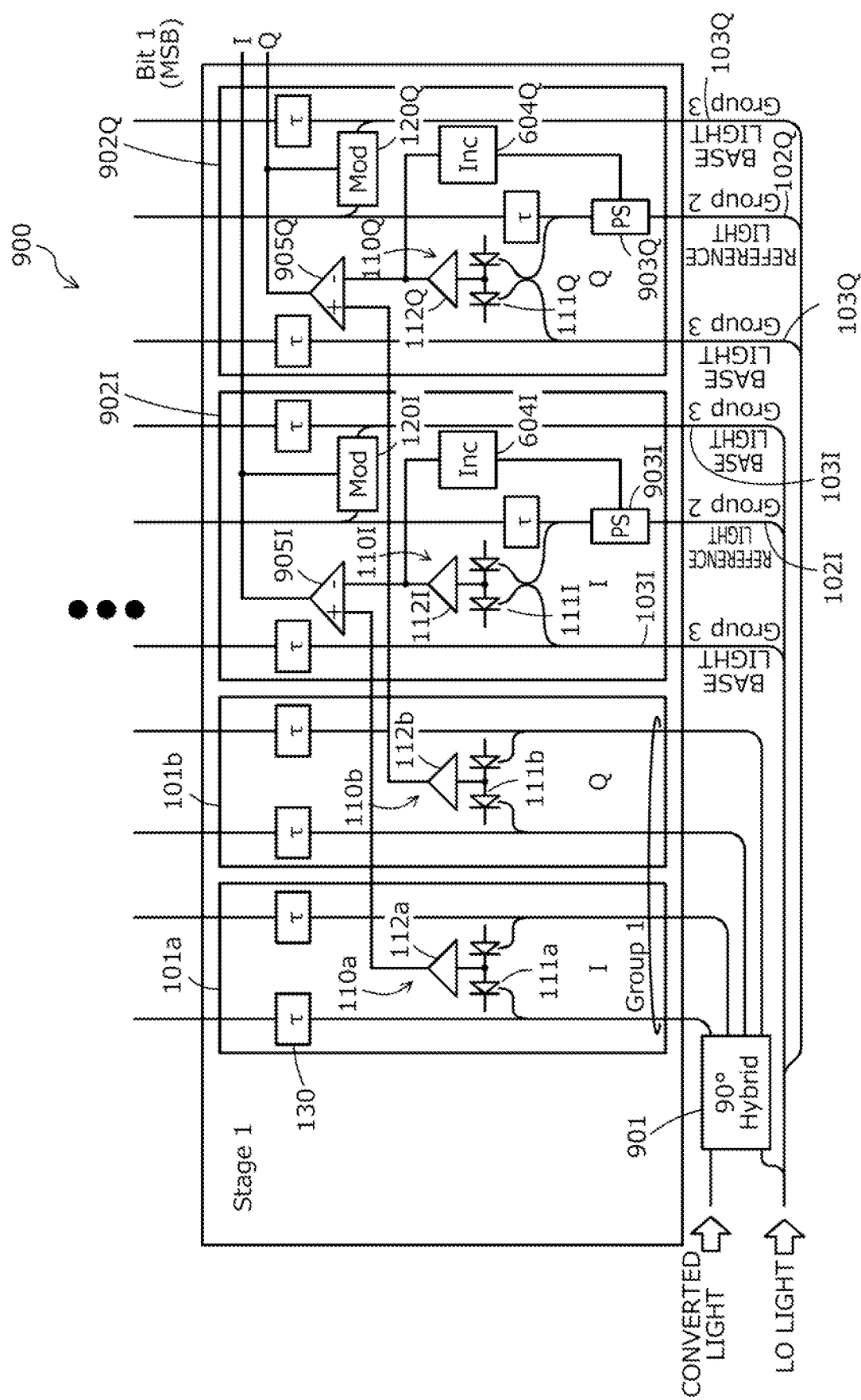
FIG. 9 is a circuit diagram illustrating an optical AD converter for IQ modulation.

FIG. 9 is a circuit diagram illustrating an optical AD converter for IQ modulation. Constituent elements of an optical AD converter 900 for IQ modulation illustrated in FIG. 9 that are similar to those of the optical AD converter 100 described above are denoted by the same reference signs. FIG. 9 illustrates only Stage 1 of the N stages, and the other Stages 2 to N are the same as those illustrated in FIG. 1.

The optical AD converter 900 for IQ modulation is provided with a 90-degree hybrid circuit 901, and performs IQ separation on input converted light by the 90-degree hybrid circuit 901. The optical waveguide 101 of Group 1 includes optical waveguides 101a and 101b corresponding respectively to the IQ separation. According to this embodiment, the optical waveguide 101 of Group 1 for converted light is subjected to IQ separation and separated (optical branched) into an X-polarized wave and a Y-polarized wave, and has a total of four optical waveguides.

The light receiving units 110a and 110b are provided in the optical waveguides 101a and 101b, respectively. The light receiving unit 110a includes a pair of light receiving elements 111a and a comparator 112a. The comparator 112 may be configured by an amplifier without requesting linearity.

Further, the optical AD converter 900 for IQ modulation branches the input LO light; one branch is input to the 90-degree hybrid circuit 901, and the other branch is input to the optical waveguide 102 of Group 2 and the optical waveguide 103 of Group 3. The optical waveguide 102 of Group 2 and the optical waveguide 103 of Group 3 are branched into base light and reference light for IQ. The optical waveguide 102 of Group 2 for the reference light is branched into two for IQ. The optical waveguide 103 of Group 3 for the base light is branched into two for light receiving units 110I and 110Q of IQ, and is further branched into two for optical modulation units 120I and 120Q of IQ.

Describing an I processing unit 9021, the base light of an optical waveguide 1031 of Group 3 and the reference light of an optical waveguide 1021 of Group 2 are multiplexed and then branched again, and are input to the light receiving unit 110I. The light receiving unit 110I includes a pair of differential-type light receiving elements 111I and a comparator 112I.

The base light of the optical waveguide 1031 of Group 3 is input to the optical modulation unit 120I. A modulation output of the optical modulation unit 120I is multiplexed into the optical waveguide 102I of Group 2. A phase shifter (PS) 903I is provided over the optical waveguide 102I of Group 2. In the drawing, Inc corresponds to the controller 604 (see FIG. 6A). The controller 604 monitors the output of the comparator 112I and controls the phases of the base light and the reference light to be the same.

An output of the comparator 112a and an output of the comparator 112I are input to a comparator 905I. The comparator 905I compares outputs of the comparator 112a and the comparator 112I, and digitally outputs an I component of a comparison result.

Also, a Q processing unit 902Q has the same configuration as that of the I processing unit 902I. In the Q processing unit 902Q, the base light of the optical waveguide 103Q of Group 3 and the reference light of the optical waveguide 102Q of Group 2 are input to the light receiving unit 110Q.

The base light of the optical waveguide 103Q of Group 3 is input to the optical modulation unit 120Q, and a modulation output of the optical modulation unit 120Q is multiplexed into the optical waveguide 102Q of Group 2. An output of a comparator 112b and an output of a comparator 112Q are input to a comparator 905Q. The comparator 905Q compares the outputs of the comparator 112b and the comparator 112Q, and digitally outputs a Q component of a comparison result.

Figures 10A, 10B:
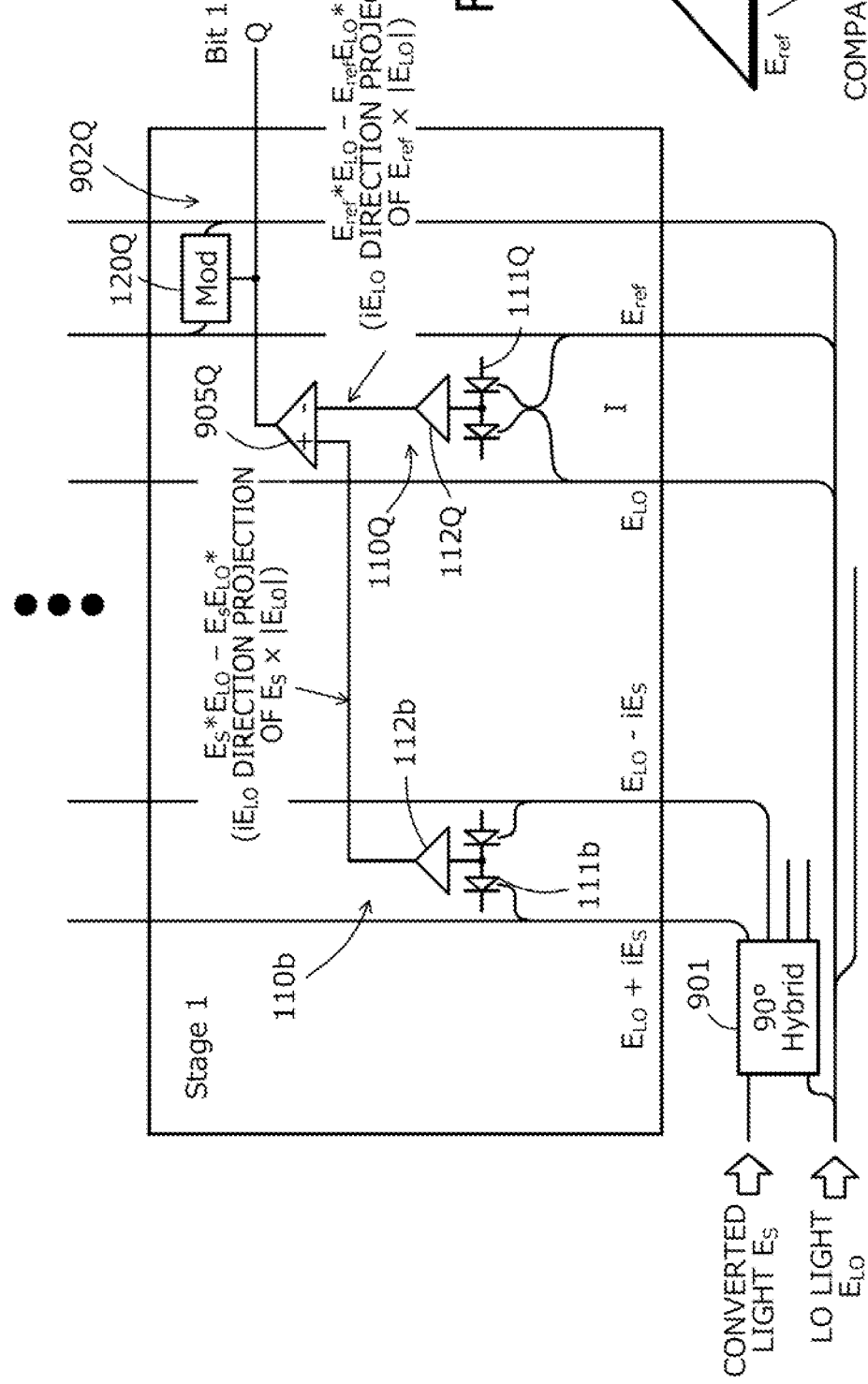
FIGS. 10A and 10B are explanatory diagrams of an operation example of the optical AD converter for IQ modulation.

FIGS. 10A and 10B are explanatory diagrams of an operation example of the optical AD converter for IQ modulation. FIG. 10A illustrates only the light receiving unit 110b and the Q processing unit 902Q, and omits illustration of the delay device τ (130) and phase adjustment. The converted light input to the optical AD converter 900 for IQ modulation has an electric field vector $E_S$, and the LO light has an electric field vector $E_{LO}$. FIG. 10B illustrates the electric field intensity on the IQ axis.

In this case, as an output of the 90-degree hybrid circuit 901, one of the differential-type light receiving elements 111b of the light receiving unit 110b detects an electric field vector $E_{Lo}+iE_S$, and the other of the light receiving elements 111b detects an electric field vector $E_{LO}-iE_S$. The comparator 112b extracts an $iE_{LO}$ direction projection of $E_S \times |E_{LO}|$ of illustrated in FIG. 10B ($E_S^* E_{Lo} - E_S E_{LO}^*$, * is a complex conjugate), and outputs the extracted result to the comparator 905Q as a comparison result.

On the other hand, the comparator 112Q of the light receiving unit 110Q of the Q processing unit 902Q extracts an $iE_{LO}$ direction projection of $E_{ref} \times |E_{LO}|$ illustrated in FIG. 10B ($E_{ref}^* E_{LO} - E_{ref} E_{LO}^*$), and outputs the extracted result to the comparator 905Q as a comparison result.

As illustrated in FIG. 10B, $E_{LO}$ and $E_{ref}$ are oriented in the same direction by the phase adjustment of the controller 604 of the Q processing unit 902Q. Accordingly, the comparator 905Q may output the digital value of the Q component of the bit 1.

Figure 11:
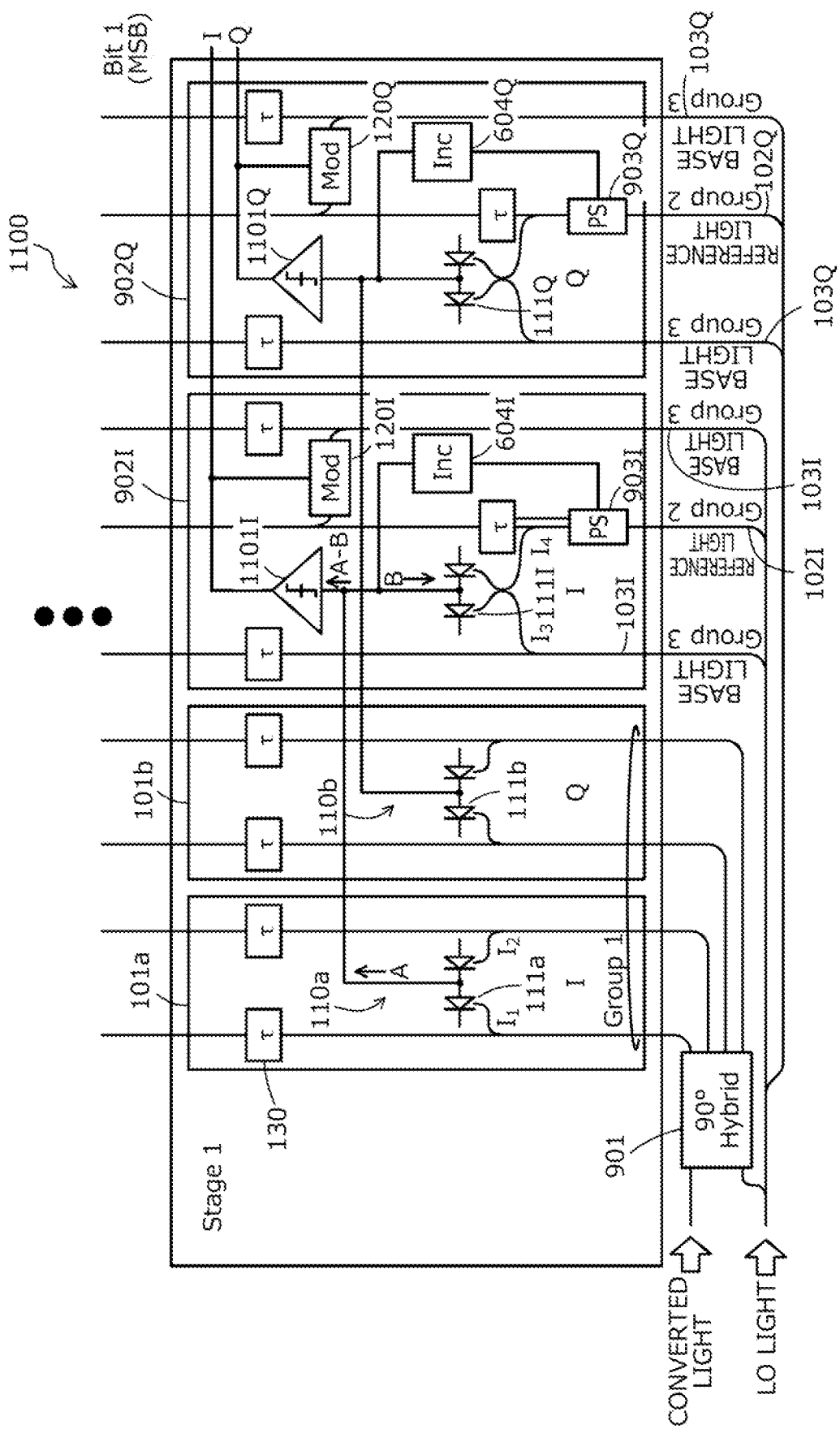
FIG. 11 is a circuit diagram illustrating another configuration example of the optical AD converter for IQ modulation.

FIG. 11 is a circuit diagram illustrating another configuration example of the optical AD converter for IQ modulation. An optical AD converter 1100 for IQ modulation illustrated in FIG. 11 is a configuration example in which the number of the comparators 112a, 112b, 905I, and 905Q used in the optical AD converter 900 for IQ modulation illustrated in FIG. 9 is reduced. Constituent elements in FIG. 11 that are similar to those illustrated in FIG. 9 are denoted by the same reference signs.

As illustrated in FIG. 11, the light receiving units 110a and 110b are provided with only the light receiving elements 111a and 111b, respectively, and the comparators 112a and 112b illustrated in FIG. 9 are not provided. Also in the I processing unit 902I and the Q processing unit 902Q, only the light receiving elements 111I and 111Q are provided, and the comparators 112I and 112Q are not provided.

An output of the light receiving element 111a and an output of the light receiving element 111I for the I component are input to the discriminator 1101I. An output A of the light receiving element 111a is $I_1-I_2$, and an output B of the light receiving element 111I is $I_3-I_4$. Accordingly, the discriminator 1101I may output the digital value of the I component of the bit 1 for $(I_1-I_2)-(I_3-I_4)$.

Similarly, an output of the light receiving element 111b and an output of the light receiving element 111Q for the Q component are input to the discriminator 1101Q. Accordingly, the discriminator 1101Q may output the digital value of the Q component of the bit 1.

According to the configuration example in FIG. 11, two discriminators for comparison may be provided for one stage, and the number of comparators may be reduced with respect to the six comparators 112 (112a, 112b, 112I, 112Q, 905I, 905Q) used in the configuration example in FIG. 9 and power consumption may be reduced.

Figure 12:
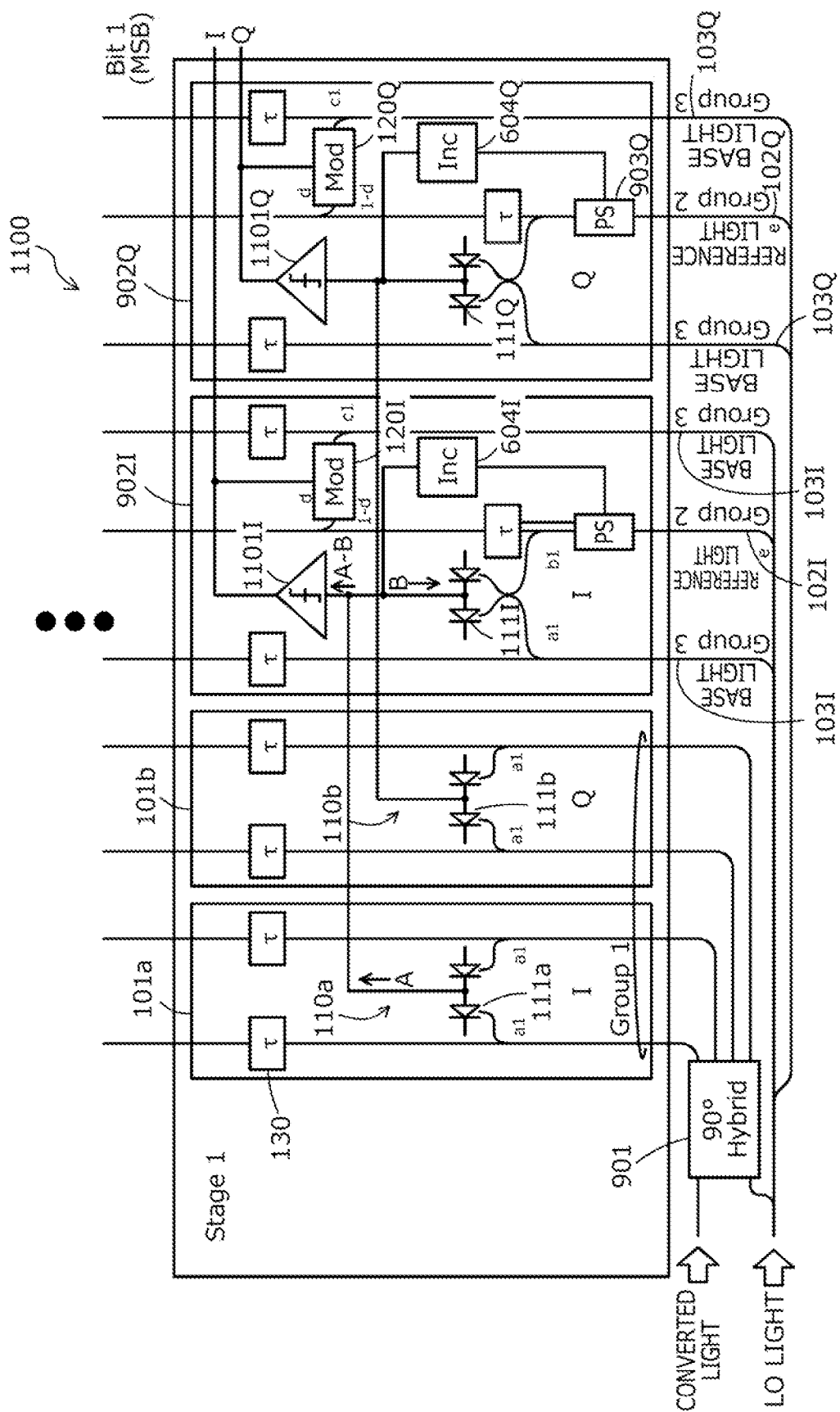
FIG. 12 is an explanatory diagram of a branching ratio of intensity of light to be incident on a light receiving element of the optical AD converter for IQ modulation.

FIG. 12 is an explanatory diagram of a branching ratio of the intensity of light to be incident on the light receiving element of the optical AD converter for IQ modulation. By using the optical AD converter 1100 for IQ modulation illustrated in FIG. 11 as an example, the branching ratio of the light intensity with respect to the pair of differential-type light receiving elements 111 will be described with reference to FIG. 12.

In FIG. 12, a pair of branching ratios in the light receiving element 111a is $a_1$, and a pair of branching ratios in the light receiving element 111b is $a_1$. As for the light receiving element 111I of the I processing unit 902I, meanwhile, the branching ratio of the base light of Group 3 is $a_1$, and on the other hand, the branching ratio of the reference light of Group 2 is $b_1$. A branching ratio of the base light of Group 3 with respect to the optical modulation units 120I and 120Q is $c_1$, and an attenuation of light intensity is d. The light intensity of the reference light of Group 2 is denoted by e.

In this case, the branching ratio $a_1$ is set based on the following formula (1). The branching ratio $b_1$ is set based on the following formula (2). The branching ratio $c_1$ is set based on the following formula (3).

$$a_1 < t^{N-1}\frac{1-t}{1-t^N}, \quad a_i = \frac{a_1}{t^{i-1} - \frac{t-t^i}{1-t}a_1} \quad (1)$$

$$b_1 < [(1-d)t]^{N-1}\frac{1-[(1-d)t]}{1-[(1-d)t]^N},$$

$$b_i = \frac{b_1}{[(1-d)t]^{i-1} - \frac{[(1-d)t]-[(1-d)t]^i}{1-[(1-d)t]}b_1} \quad (2)$$

$$c_1 = \frac{(1-b_1)(1-d)e}{4d(1-e)},$$

$$c_i = \frac{c_{i-1}}{4t(1-c_{i-1})} \cdot \frac{[(1-d)t]^i - \frac{[(1-d)t]-[(1-d)t]^{i+1}}{1-[(1-d)t]}b_1}{[(1-d)t]^{i-1} - \frac{[(1-d)t]-[(1-d)t]^i}{1-[(1-d)t]}b_1} \quad (3)$$

The optical AD converter 1100 for IQ modulation has N stages (Stages 1 to N), and when the same branching ratio is set in each stage, the light intensity decreases in the latter stages. For this reason, by the above-described setting, the attenuation in each stage, for example, the branching ratio in the light receiving element 111 to which the modulation output of the optical modulation unit 120 is input is appropriately set. Accordingly, the light intensities of the signal light (converted light, base light, and reference light) incident on each of the N stages (Stages 1 to N) may be made uniform.

[Configuration Example of Optical Receiver]

FIG. 13 to FIG. 16 illustrate a configuration example of an optical receiver. The configuration example of the optical receiver including the optical AD converters 100 and 1100 described above will be described. Constituent elements similar to those of the above-described configuration are denoted by the same reference signs in the drawings.

Figure 13:
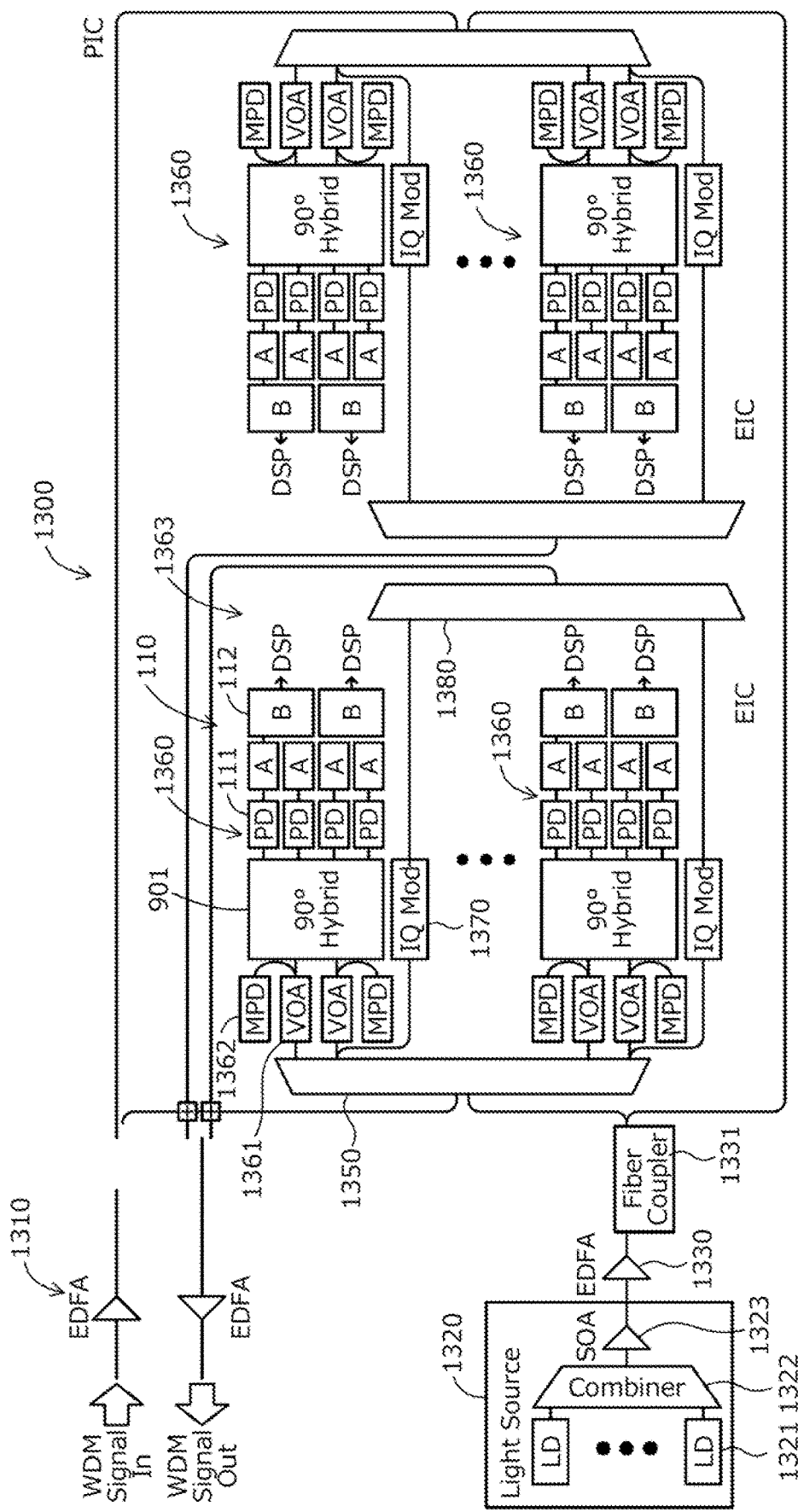
FIG. 13 is a diagram illustrating a configuration example of an optical receiver (part 1)

Wavelength division multiplexing (WDM) light is input to an optical receiver 1300 illustrated in FIG. 13. The WDM light is input to a wavelength demultiplexing unit 1350 via an erbium doped fiber amplifier (EDFA) 1310. Local light (LO light) from a local oscillation light source 1320 is input to the wavelength demultiplexing unit 1350.

The local oscillation light source 1320 includes a light source (laser diode (LD)) 1321 in accordance with a plurality of wavelengths, a combiner 1322 that multiplexes light of the LDs having a plurality of wavelengths, and a semiconductor optical amplifier (SOA) 1323. The LO light output from the local oscillation light source 1320 is optically amplified by an EDFA 1330, branched by a fiber coupler 1331, and input to the wavelength demultiplexing unit 1350.

The wavelength demultiplexing unit (Demux) 1350 separates and outputs input WDM light and LO light by wavelength, and outputs the WDM light and the LO light to a plurality of receiving units 1360 by wavelength. A reception signal (converted light) input to the receiving unit 1360 of a certain wavelength (one channel) is input to the 90-degree hybrid circuit 901 via a variable optical attenuator (VOA) 1361. A MPD 1362 monitors converted light input thereto, and variably controls the VOA 1361.

In a subsequent stage of the 90-degree hybrid circuit 901, the light receiving unit 110 described above is provided. The light receiving unit 110 includes the pair of light receiving elements 111 for I and Q and the discriminator 112. Although not illustrated, the above-described optical modulation unit 120 is coupled to the light receiving element 111 and the discriminator 112. A bitwise digital output of the discriminator 112 is input to a digital signal processor (DSP) 1363 as a data processing unit. The DSP 1363 performs data processing on a digital signal after AD conversion, extracts information included in the converted light, and outputs the extracted information.

The plurality of light receiving units 1360 performs reception processing by different wavelengths, thereby performing reception processing on the WDM light by wavelength (a plurality of channels).

Further, in the example illustrated in FIG. 13, an IQ modulation unit 1370 is coupled to an output of the wavelength demultiplexing unit 1350 in the plurality of light receiving units 1360. A modulation output of the IQ modulation unit 1370 of the plurality of light receiving units 1360 is multiplexed by a wavelength multiplexing unit (Mux) 1380, and may be output to the outside as a WDM signal.

Figure 14:
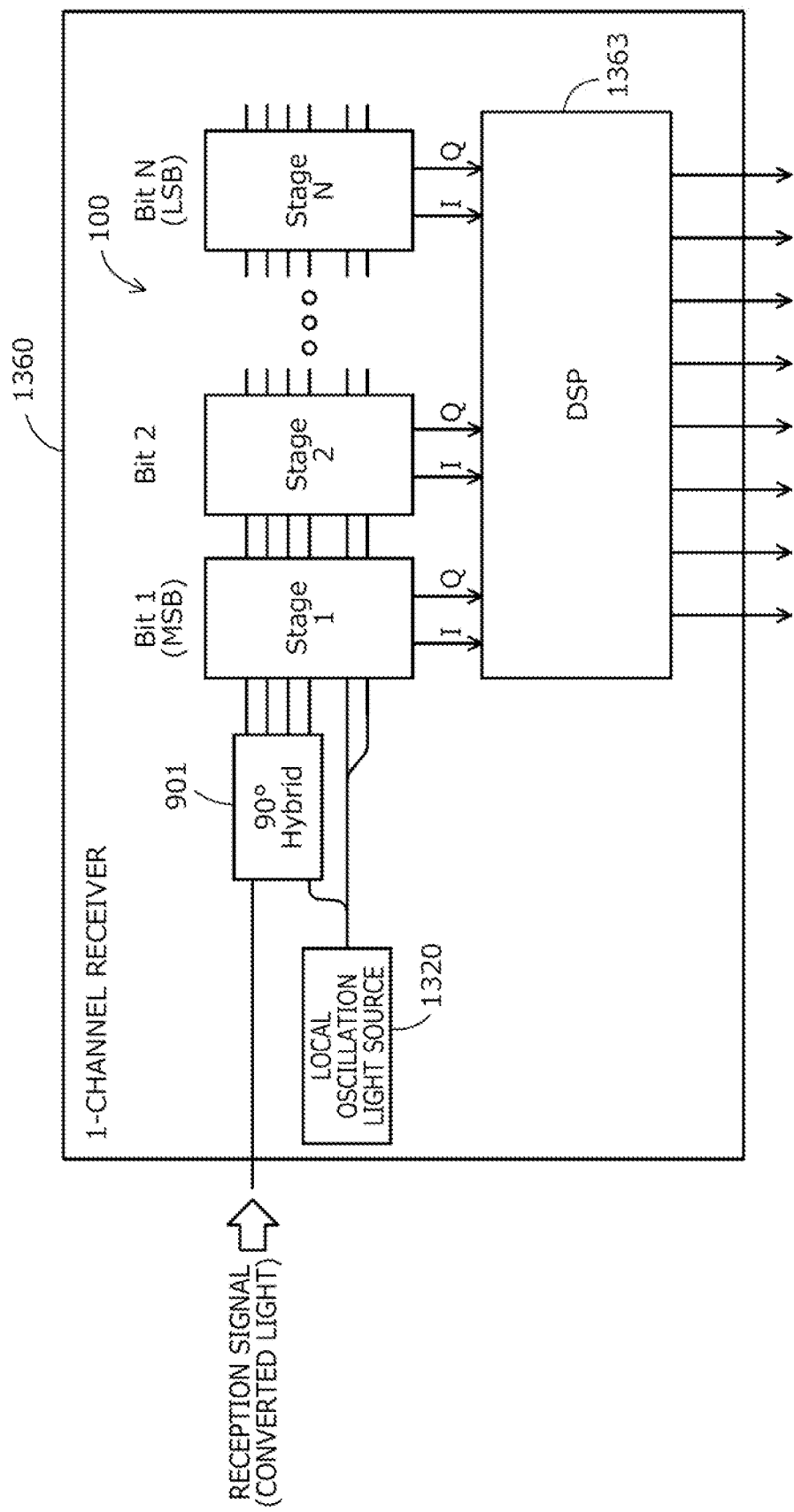
FIG. 14 is a diagram illustrating a configuration example of the optical receiver (part 2)

FIG. 14 illustrates a configuration example of the 1-channel receiver 1360. The 1-channel receiver 1360 for WDM signals includes the 90-degree hybrid circuit 901, the local oscillation light source 1320, and the DSP 1363, in addition to the optical AD converter 100 described above.

As described above, the 1-channel receiver 1360 includes N stages (Stages 1 to N), guides the converted light and the LO light from the local oscillation light source 1320 between the stages, and outputs the bit value of digit corresponding to the digital signal for each stage. Stages 1 to N each include the light receiving unit 110 and the optical modulation unit 120.

An IQ digital signal output from each stage (Stages 1 to N) is output to the DSP 1363. The DSP 1363 performs data processing on a digital signal after AD conversion, extracts information included in the converted light, and outputs N-bit digital signals of MSB to LSB in the binary output.

Figure 15:
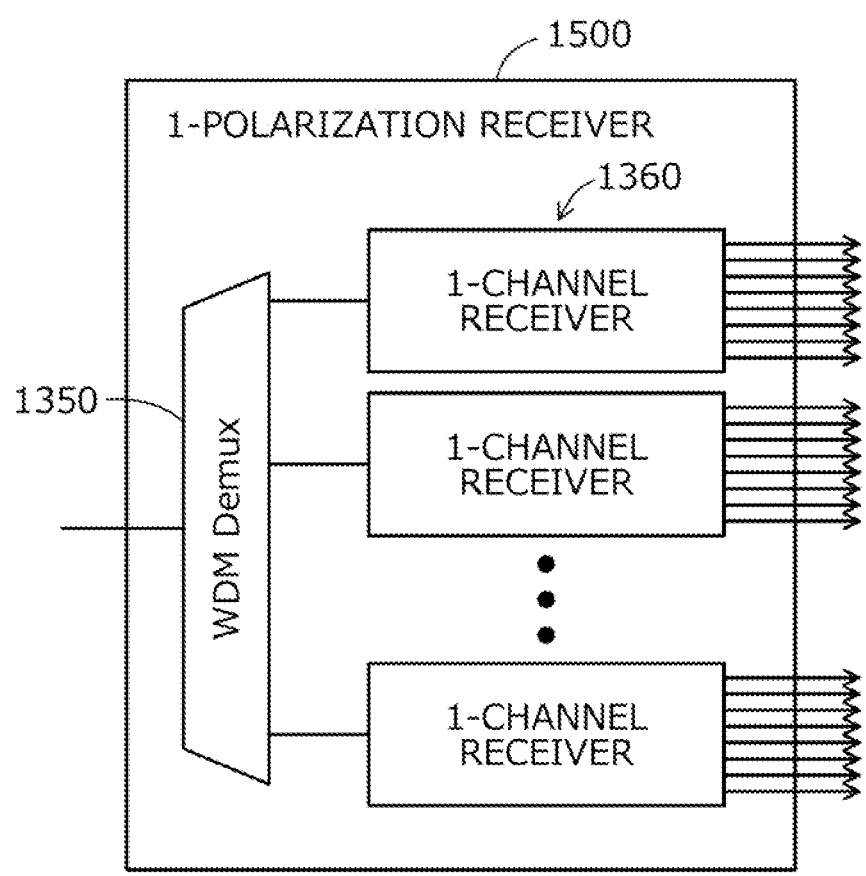
FIG. 15 is a diagram illustrating a configuration example of the optical receiver (part 3)

FIG. 15 illustrates a configuration example of a 1-polarization receiver 1500. In the 1-polarization receiver 1500, a plurality of 1-channel receivers 1360 is coupled to the wavelength demultiplexing unit (Demux) 1350 by channel. The plurality of 1-channel receivers 1360 each outputs information included in the converted light as a digital signal of a plurality of bits.

Figure 16:
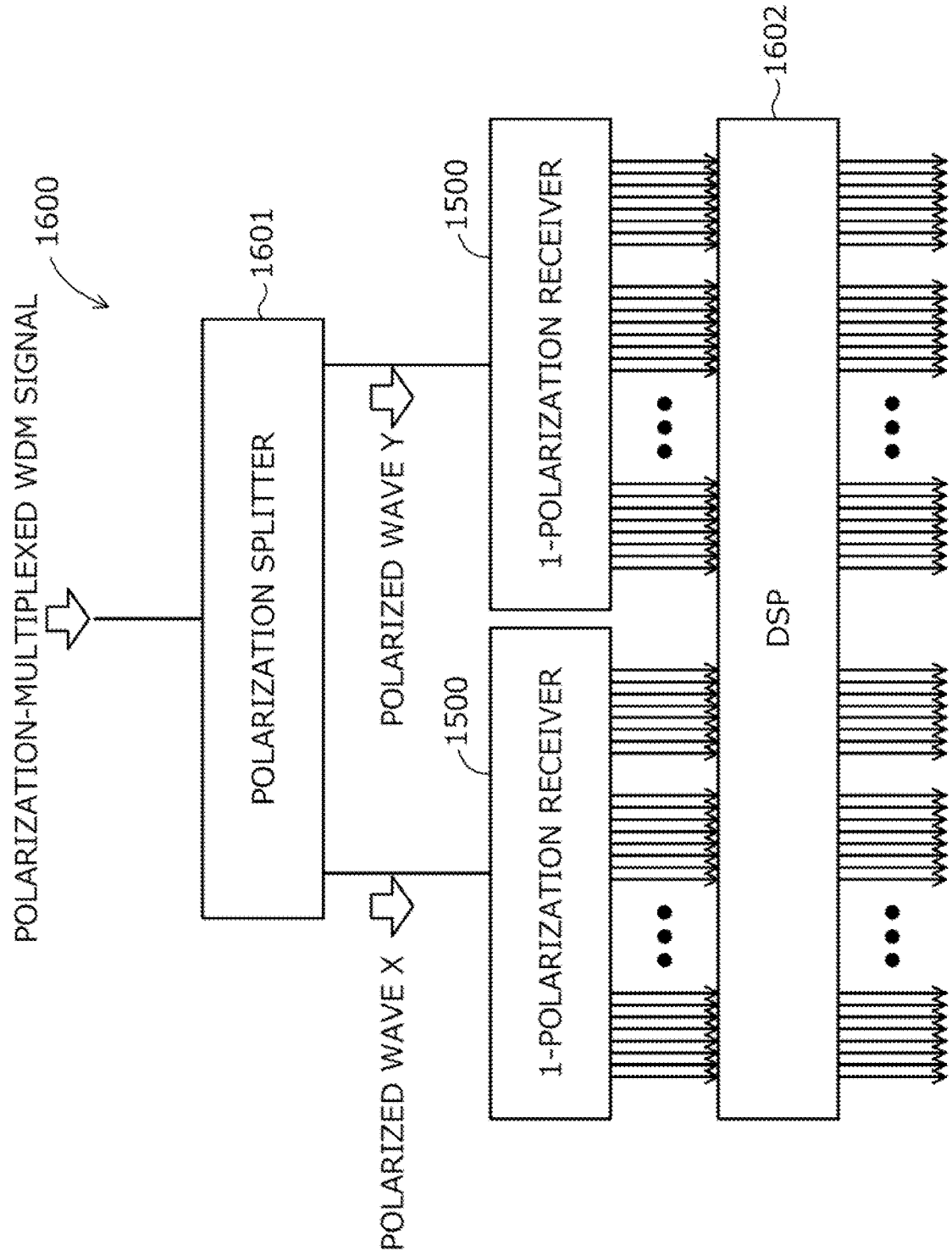
FIG. 16 is a diagram illustrating a configuration example of the optical receiver (part 4).

FIG. 16 illustrates a configuration example of a WDM receiver 1600. A polarization multiplexed WDM signal is input to the WDM receiver 1600, and a polarized wave X and a polarized wave Y are separated and output by a polarization splitter 1601. An output of each of the polarized waves X and Y is output to the 1-polarization receiver 1500. Each of the 1-polarization receivers 1500 outputs information included in the converted light as a digital signal of a plurality of bits in accordance with the plurality of channels.

Based on a plurality of outputs of the 1-polarization receivers 1500 for the polarized wave X and the polarized wave Y, a DSP 1602 outputs information for the polarized wave X and the polarized wave Y of the converted light as a digital signal of a plurality of bits. The DSP 1602 may integrate processing with the DSP 1363 included in the 1-polarization receiver 1500 (1-channel receiver 1360).

The optical AD converter of the embodiment may be applied to various receivers that receive signal light by polarization multiplexing such as WDM communication and various modulation methods and perform AD conversion on the signal light.

The optical AD converter according to the embodiments described above is an optical AD converter that converts an analog signal of information included in input signal light into a digital signal, in which N stages corresponding to the number N of bits of the digital signal each include optical waveguides that respectively guide signal light, base light obtained by branching local light, and reference light obtained by branching the local light, a light receiving unit that detects and compares light levels of the signal light and the reference light and outputs a binary comparison result as a digital value, and an optical modulator that variably controls the light level of the base light based on the comparison result of the light receiving unit. A modulation output of the optical modulator is multiplexed with reference light in the next stage.

The optical AD converter is an optical AD converter that converts an analog signal of information included in input signal light into a digital signal, and includes N stages corresponding to the number N of bits of the digital signal, in which the N stages each include an optical waveguide of Group 1 that branches and inputs the signal light and is configured by one or more waveguides, an optical waveguide of Group 2 that is configured by one or more waveguides and guides, when one of branched local light is referred to as reference light, the reference light, and an optical waveguide of Group 3 that is configured by one or more waveguides and guides, when the other of the branched local light is referred to as base light, the base light. A light receiving unit that detects and compares light levels of the signal light and the reference light and outputs a binary comparison result as a digital value of the stage, and an optical modulator into which the base light guided by the optical waveguide of Group 3 is branched and input, and which variably controls the light level of the base light by modulation based on the comparison result of the light receiving unit are included. The optical waveguide of Group 2 multiplexes a modulation output of the above-described modulation unit with the reference light and guides the multiplexed signal as the reference light of the next stage, thereby outputting an N-bit digital signal by the N stages.

Accordingly, bit-by-bit sequential comparison may be performed as in the existing AD converter. The existing AD converter requests linearity for a TIA, a DAC, and the like of an electric circuit, resulting in increased power consumption. By contrast, the optical AD converter of the embodiment does not use a TIA, a DAC, and an S/H circuit. Further, since the circuit for the sequential processing includes not only the electric circuit but also the optical circuit, and comparators of the electric circuit are respectively disposed in the plurality of N stages that perform the sequential comparison, the electric circuit such as the comparator may perform the comparison processing without requesting linearity, and low power consumption may be achieved.

In the optical AD converter, the light receiving unit may be configured to include a pair of differential-type light receiving elements that detect the signal light and the reference light, and a comparator that compares and outputs the light levels of the signal light and the reference light based on the differential output of the pair of light receiving elements. Unlike the existing AD converter in which the light receiving unit is provided outside, the optical AD converter of the embodiment may achieve low power consumption because the light receiving unit is provided for each stage inside and linearity is not requested for the comparator of the light receiving unit.

In the optical AD converter, the comparator outputs a value 1 when the light level of the reference light is higher than the light level of the signal light, and outputs a value 0 in other cases. Accordingly, a binary digital output for each bit may be performed with a simple configuration of the comparator.

The optical AD converter sets a predetermined branching ratio for one and the other of the light receiving elements, and equalizes input levels to the N stages. By setting the same branching ratio in the N stages, the light intensity decreases in the latter stages. Regarding this point, by appropriately setting attenuation in each stage, for example, the branching ratio in the light receiving element to which the modulation output of the optical modulation unit is input, the light intensity of signal light (converted light, base light, and reference light) incident on each stage of the N stages may be made uniform, and the bit determination may be stably performed.

Further, in the optical AD converter, the optical modulator performs phase modulation in phase or in opposite phase with the reference light by using the base light based on the comparison result of the light receiving unit. For example, the optical modulator performs phase modulation in phase with the reference light when the output of the comparator has a value 1, and performs phase modulation in opposite phase with the reference light when the output of the comparator has a value 0. Accordingly, in the optical modulator, the modulation output of the modulation unit is multiplexed with the reference light in the next stage only by switching the modulation output to the same phase or the opposite phase, and the light intensity of the reference light in the next stage may be controlled.

In the optical AD converter, a delay device that matches the timing of the signal light, the reference light, and the base light may be provided in the optical waveguide. By setting an appropriate delay time in the delay device, it is possible to match the timing of the signal light of each group in each of the N stages, and to stably perform bit determination in each stage.

The optical AD converter may use an optical modulator that arranges a pair of electrodes along a branched optical waveguide and performs voltage control on the electrodes. As described above, it is possible to easily obtain the optical AD converter by using the optical modulator for general purposes.

The optical waveguide is branched by IQ in accordance with input of signal light for IQ modulation, the optical AD converter may provide a 90-degree hybrid circuit in the optical waveguide of the signal light.

The optical modulator may be configured to include the optical AD converter described above, a local oscillation light source that generates local light, and a data processing unit that outputs information included in signal light after AD conversion by the optical AD converter. For example, the optical modulator may be easily obtained by using a general-purpose local oscillation light source and a DSP as a data processing unit.

The optical modulator may be simply configured to include a polarization splitter that performs polarization separation on signal light in accordance with input of a WDM signal of the signal light that is polarization multiplexed.

For these reasons, according to the optical AD converter of the embodiment, it is possible to directly input the optical signal and output the digital electric signal, and thus low power consumption may be achieved. According to the embodiment, data addition and subtraction processing and signal latching performed by the electric circuit of the existing AD converter are realized by branching/multiplexing of the optical circuit (optical waveguide) and variable control of the light intensity of reference light by the optical modulator. The optical circuit may be reduced in size by miniaturization and integration of the optical waveguide.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical analog-to-digital (AD) converter comprising:
   wherein the optical AD converter converts an analog signal of information included in inputted signal light into a digital signal, and is formed of N stages corresponding to a number N of bits of the digital signal,
   optical waveguides configured to respectively guide the signal light, base light obtained by branching local light, and reference light obtained by branching the local light;

a light receiver configured to detect and compare light levels of the signal light and the reference light, and output a binary comparison result; and an optical modulator configured to variably control a light level of the base light, based on the binary comparison result, in each stage of the N stages, wherein an output variably controlled of the optical modulator is multiplexed with the reference light of a next stage.

2. An optical analog-to-digital (AD) converter comprising:

wherein the optical AD converter converts an analog signal of information included in inputted signal light into a digital signal, and is formed of N stages corresponding to a number N of bits of the digital signal, a first optical waveguide of group 1 configured to branch and input the signal light, the group 1 including one or more waveguides;

a second optical waveguide of group 2 configured to guide reference light that is one of lights to which local light is branched as reference light, the group 2 including one or more waveguides;

a third optical waveguide of group 3 configured to guide base light that is another of the light to which the local light branched, as base light;

a light receiver configured to detect and compare light levels of the signal light and the reference light, and output a binary comparison result as a digital value of a stage of the N stages; and an optical modulator configured to receive the base light guided by the third optical waveguide, and variably control a light level of the base light by phase modulation, based on a comparison result of the light receiver, wherein the second optical waveguide multiplexes an output variably controlled of the optical modulator with the reference light, and guides the multiplexed light as the reference light of a next stage of the N stages, so that an N-bit digital signal is outputted in the N stages.

3. The optical AD converter according to claim 1, wherein the light receiver includes a pair of differential-type light receivers configured to detect the signal light and the reference light, and a comparator configured to compare and output the light levels of the signal light and the reference light, based on a differential output of the pair of differential-type light receivers.

4. The optical AD converter according to claim 3, wherein the comparator outputs a value 1 when the light level of the reference light is higher than the light level of the signal light, and outputs a value 0 when the light level of the reference light is equal or lower than the light level of the signal light.

5. The optical AD converter according to claim 3, wherein a predetermined branching ratio is set for one and another of the pair of differential-type light receivers, and the light levels of the signal light, the reference light, and base light inputted to the N stages are made uniform.

6. The optical AD converter according to claim 1, wherein the optical modulator performs phase modulation in phase or in opposite phase with the reference light by using the base light, based on the binary comparison result.

7. The optical AD converter according to claim 6, wherein the optical modulator performs the phase modulation in phase with the reference light when the binary comparison result has a value 1, and the optical modulator performs the phase modulation in opposite phase with the reference light when the binary comparison result has a value 0.

8. The optical AD converter according to claim 1, wherein the optical waveguides include delay devices to match timing of the signal light, the reference light, and the base light, respectively.

9. The optical AD converter according to claim 1, wherein a pair of electrodes is arranged along branched optical waveguides from the optical waveguides, and the optical modulator performs voltage control for the pair of electrodes.

10. The optical AD converter according to claim 1, further comprising:

a 90-degree hybrid circuit provided for an optical waveguide of the signal light, and configured to perform IQ separation for the signal light.

11. An optical receiver comprising:

an optical analog-to-digital (AD) converter configured to include wherein the optical AD converter converts an analog signal of information included in inputted signal light into a digital signal, and is formed of N stages corresponding to a number N of bits of the digital signal, optical waveguides configured to respectively guide the signal light, base light obtained by branching local light, and reference light obtained by branching the local light, a light receiver configured to detect and compare light levels of the signal light and the reference light, and output a binary comparison result, and an optical modulator configured to variably control a light level of the base light, based on the binary comparison result, in each stage of the N stages, wherein an output variably controlled of the optical modulator is multiplexed with the reference light of a next stage;

a local oscillation light source configured to generate the local light; and a data processor configured to output the information included in the signal light converted by the optical AD converter.

12. The optical receiver according to claim 11, further comprising:

a polarization splitter configured to perform polarization separation for the signal light that is a polarization-multiplexed wavelength division multiplexing signal, wherein the signal light performed the polarization separation is guided to the AD converter.

* * * * *